(12) United States Patent
Park et al.

(10) Patent No.: US 8,560,284 B2
(45) Date of Patent: Oct. 15, 2013

(54) SYSTEM AND METHOD FOR ALTERNATIVE SIMULATION OF LOGISTICS INFRASTRUCTURE

(75) Inventors: Moon Sung Park, Daejeon (KR); Byung-Chul Cha, Daejeon (KR); Jiyoung Choi, Daejeon (KR); Hong Suk Hu, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 883 days.

(21) Appl. No.: 12/614,877

(22) Filed: Nov. 9, 2009

(65) Prior Publication Data

US 2010/0145761 A1    Jun. 10, 2010

(30) Foreign Application Priority Data

Dec. 4, 2008  (KR) .................. 10-2008-0122736
Jun. 11, 2009  (KR) .................. 10-2009-0051974

(51) Int. Cl.
   *G06G 7/48*    (2006.01)
(52) U.S. Cl.
   USPC .................................................. 703/6
(58) Field of Classification Search
   USPC .................................................. 703/6
   See application file for complete search history.

(56) References Cited

U.S. PATENT DOCUMENTS

2004/0117325 A1  6/2004  Cash et al.
2007/0099707 A1  5/2007  Smit

FOREIGN PATENT DOCUMENTS

| JP | 2003-203110 | 7/2003 |
| KR | 10-2006-0027205 | 3/2006 |
| KR | 10-0632401 | 9/2006 |
| KR | 10-2007-0030787 | 3/2007 |
| KR | 10-2008-0004247 | 1/2008 |
| KR | 10-2008-0050737 | 6/2008 |
| KR | 10-0842231 | 6/2008 |

OTHER PUBLICATIONS

Cetiner "An Iterative Hub Location and Routing Problem for Postal Delivery Systems." Jul. 2003 The Graduate School of Natural and Applied Sciences of the Middle East Technical University.*
Waiman Cheung et al., Strategic Service Network Design for DHL Hong Kong' Interfaces, vol. 31, No. 4, pp. 1-14, Jul.-Aug. 2001.

* cited by examiner

*Primary Examiner* — Saif Alhija
(74) *Attorney, Agent, or Firm* — Staas & Halsey LLP

(57) ABSTRACT

A future amount is created through demand estimation by rectifying data administrated in a logistics infrastructure through a system and a method for alternative simulation of a logistics infrastructure. In addition, an infrastructure load by a future year amount is analyzed and an alternative is selected through the load analysis.

8 Claims, 28 Drawing Sheets

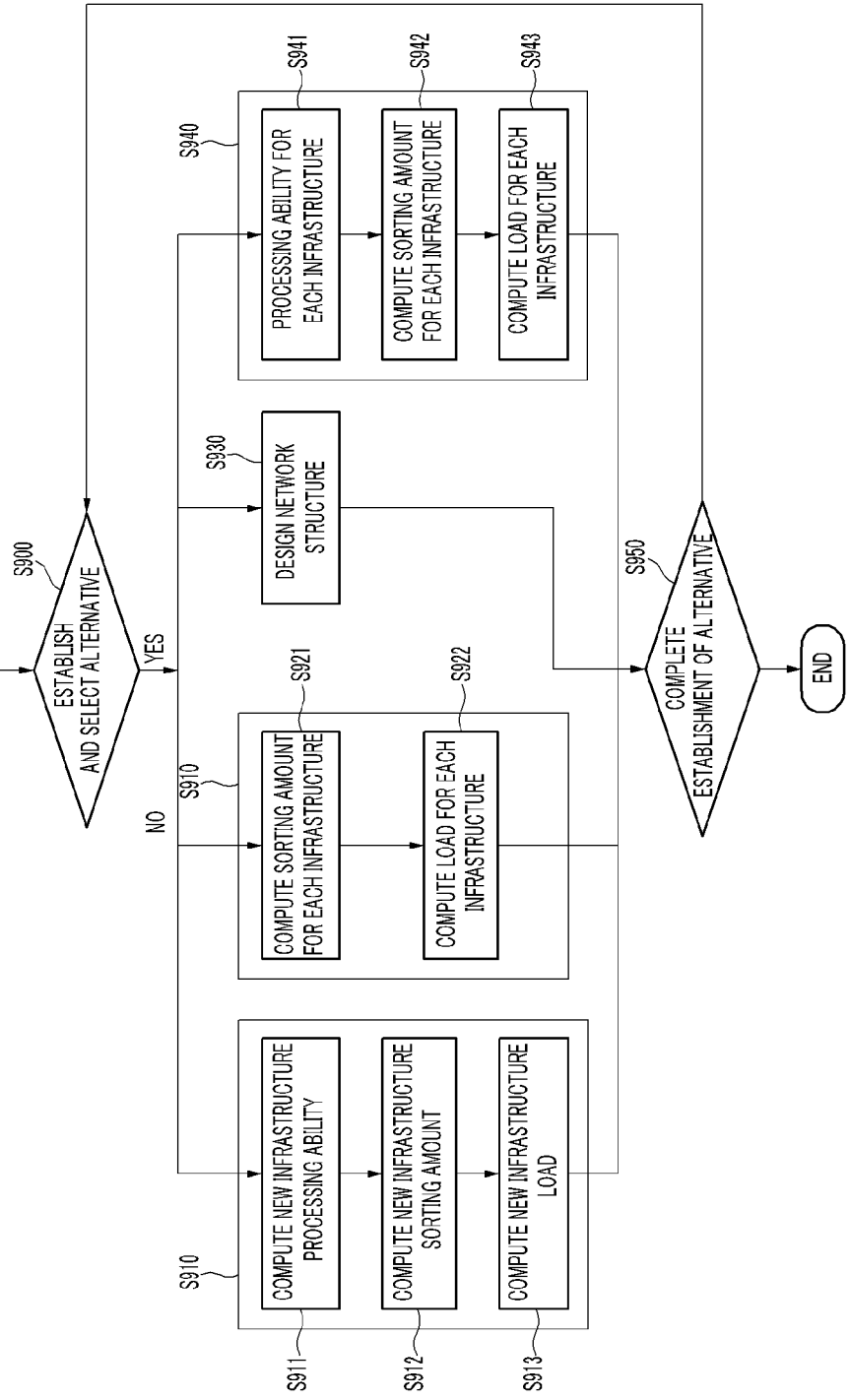

SYSTEM AND METHOD FOR ALTERNATIVE SIMULATION OF LOGISTICS INFRASTRUCTURE

CROSS-REFERENCE TO RELATED APPLICATION

This application claims priority to and the benefit of Korean Patent Application Nos. 10-2008-0122736 and 10-2009-0051974 filed in the Korean Intellectual Property Office on Dec. 4, 2008 and Jun. 11, 2009, the entire contents of which are incorporated herein by reference.

BACKGROUND OF THE INVENTION (a) Field of the Invention

The present invention relates to a system and a method for alternative simulation of a logistics infrastructure.

(b) Description of the Related Art

In general, a logistics infrastructure is established by collecting administration result data depending on the object of the establishment and establishing an alternative by using a tool that can create an optimal scheme for manual support after defining analysis methodologies and a scheme for establishing an infrastructure. The performing method and a verified method after simulation by modeling in order to improve a process in a short-term strong point are adopted.

In this case, much time is taken to collect conditions for newly establishing the infrastructure, collect data in which adjustment of a jurisdiction coverage, etc. are administrated for each object in order to adjust a load between a delivery station and a logistics center, and collect data for improving the process, etc. In addition, since a long-term infrastructure establishment plan is established by establishing alternatives by referring to various methodologies for each requirement for establishing each alternative, the methods should repeatedly perform the same work as necessary.

Further, data for establishing the alternative should be created and utilized by a demand estimation method, but it is not easy to grasp a problem in an actual strong point of the infrastructure and between the infrastructures and previous verification for a short-term alternative is impossible, such that verification of validation for a problem that may occur by applying the short-term alternative to an actual administration environment is impossible.

A simulator that supports establishment of a long-term logistics infrastructure establishment plan and uses an infrastructure load analysis simulation function drawn substantially similar to an actual infrastructure environment is required. Further, creation of a future amount required to establish the long-term logistics infrastructure establishment plan, creation of administration reference data, and detailed analysis of an infrastructure load analysis should be able to be used by acquiring simulation input data from the existing logistics administration system.

Further, a simulator that can simulate a process for each post type in the logistics strong point, a transport method between logistics strong points, and a working process of the delivery station, etc., and that can grasp a sorting work load in the logistics strong point and between the logistics strong points, a transport load, a communication quality, administration cost, etc., is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a simulation system and a simulation method having advantages of creating alternatives required to establish an infrastructure establishment plan and previously verifying the created alternatives.

An exemplary diagram of the present invention provides a system for alternative simulation of a logistics infrastructure, that includes: a user interface that receives data inputted from the outside or provides information created in the system; a data statistics analyzer that converts information into a predetermined format in order to analyze data outputted from a postal logistics information system in link with the system; a simulator that performs simulation for administration and transportation on the basis of the data outputted from the user interface or the data outputted from the data statistics analyzer; an alternative establisher that establishes and outputs an alternative depending on the data outputted from the user interface; and an information storage that stores reference information for the simulation, simulation result information, and alternative information.

Another embodiment of the present invention provides a method for alternative simulation of a logistics infrastructure, that includes: creating yearly load analysis information by analyzing a yearly load on the basis of demand estimation data when receiving the demand estimation data for any one of a basic year and a predetermined year; establishing a yearly alternative on the basis of the created yearly load analysis information; and establishing the alternative by analyzing a detailed load for each alternative on the basis of the established alternative.

BRIEF DESCRIPTION OF THE DRAWINGS

FIG. 23 is a flowchart illustrating a procedure after establishing an alternative according to an embodiment of the present invention.

DETAILED DESCRIPTION OF THE EMBODIMENTS

Figure 1:
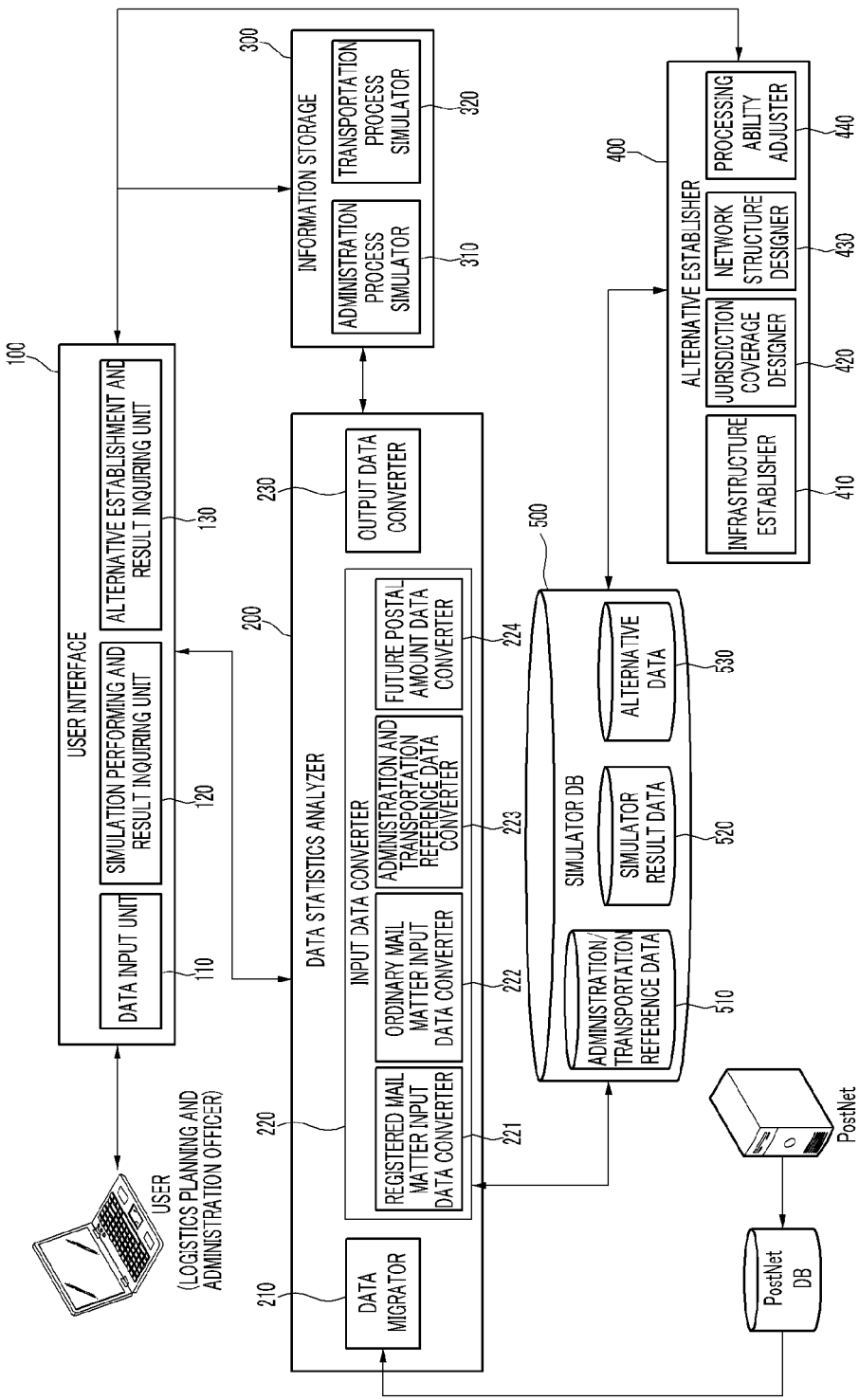
FIG. 1 is a system structure diagram according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements.

Hereinafter, a system and a method for alternative simulation of a logistics infrastructure according to an embodiment of the present invention will be described with reference to the accompanying drawings.

FIG. 1 is a system structure diagram according to an embodiment of the present invention.

As shown in FIG. 1, the system according to the embodiment of the present invention includes a user interface 100, a data statistics analyzer 200, a simulator 300, an alternative establisher 400, and an information storage 500.

First, the user interface 100 receives various data from a user and provides information generated in the system to the user. The user interface 100 includes a data input unit 110, a simulation performance and result inquiring unit 120, and an alternative establishment and result inquiring unit 130.

The data input unit 110 is connected to an information input means used by a user such as a logistics planning and administration officer to collect the data inputted from the user. Further, the data inputted from the user is transferred to the data statistics analyzer 200.

The simulation performance and result inquiring unit 120 receives the data inputted through the data input unit 110, and transfers the data to the simulator 300 in link with the simulator 300 or receives a result simulating the data in the simulator 300 and provides the simulation result to the user.

The alternative establishment and result inquiring unit 130 transfers the data collected by the data input unit 110 or the data outputted by the simulator 300 to establish an alternative on the basis of the data in link with the alternative establisher 400. Further, the alternative establishment and result inquiring unit 130 receives an alternative result related to the data generated by the alternative establisher 400 and provides the alternative result to the user.

Next, the data statistics analyzer 200 converts information transmitted from a post logistics information system (Post-Net) into a predetermined format in order to analyze the information. For this, the data statistics analyzer 200 includes a data migrator 210, an input data converter 220, and an output data converter 230.

The data migrator 210 converts data transmitted from the post logistics information system or the data transmitted from the user interface 100 into a data format required to establish a long-term alternative and a simulated infrastructure load analysis. Basic year input data required for simulation can be previously generated through conversion of the data format.

The input data converter 220 creates a future year input amount on the basis of a basic year amount into which demand estimation information is inputted by the user by referring to a predetermined demand estimation creation result required to start the simulation, and generates the created future year input amount as simulation performance result data which is simulation input amount information. For this, the input data converter 220 is largely constituted by a registered mail matter input data converter 221, an ordinary mail matter input data converter 222, an administration and transportation reference data converter 223, and a future postal amount data generator 224. A detailed structure of the input data converter 220 will be described below.

The output data converter 230 converts the simulation performance result data into output data such as load, communication quality, etc., in order to provide the simulation performance result generated from the input data converter 220 to the user. That is, a simulation input data amount is generated as a basic year amount based on an actual administration result and a simulation input amount in order to previously evaluate a future year by using a demand estimation method for each year, each logistics strong point, each day, each time, each post type, each working condition, and information from a reception station to a delivery station with respect to the logistics infrastructure.

Next, the simulator 300 simulates administration and transportation of the corresponding data on the basis of the data transmitted from the simulation performance and result inquiring unit 120 of the user interface 100 or the data inputted from the data statistics analyzer 200. The simulator 300 includes an administration process simulator 310 and a transportation process simulator 320.

When statistics simulation data outputted from the data statistics analyzer 200 or the data outputted from the user interface 100 is inputted, the administration process simulator 310 simulates administration process logic in strong points (i.e., exchange center (transportation exchange center), central station (mail sorting and distribution center), logistics center, or delivery station (delivery office)). A strong point load is calculated with respect to the inputted amount by modeling the administration process for a strong point that is currently administrated for each strong point through the simulation.

The transportation process simulator 320 simulates a transportation process on a transportation network (i.e., an exchange network between an exchange center and the central station, a central station network between the central station and the logistics center, a post office network between the central station and a control station, etc.) for transportation between logistics strong points by a result that the administration process simulator 310 determines within the logistics strong point. In addition, the transportation process simulator 320 calculates the number of required vehicles and transportation cost by modeling a current transportation process for each transportation network.

Next, when the alternative establisher 400 receives the data from the user interface 100, the alternative establisher 400 establishes the alternative depending on the received data and provides the alternative to the user. The alternative establisher 400 according to the embodiment of the present invention includes an infrastructure establisher 410, a jurisdiction coverage designer 420, a network structure designer 430, and a processing ability adjustor 440.

The infrastructure establisher 410 establishes an infrastructure depending on the simulation result for the future amount. A load for each infrastructure can be recalculated by setting a processing ability of a new infrastructure and a jurisdiction coverage depending on the establishment of the infrastructure.

The jurisdiction coverage designer 420 recalculates the load for each infrastructure by resetting ordinary post and parcel jurisdiction coverage of the existing infrastructure. The network structure designer 430 designs a network structure by establishing the exchange center and setting an exchange time and coverage to generate reference information of the simulation.

The processing ability adjustor 440 redesigns the jurisdiction coverage by adjusting the existing infrastructure functions such as dedication of ordinary post, parcel, etc., and recalculates the load of the infrastructure by adjusting a sorting processing ability of an overload infrastructure to adjust a processing ability in a logistics strong point.

Next, the information storage 500 includes an administration/transportation reference data storage 510 that stores reference information for the simulation, a simulation result data storage 520 that receives and stores the simulation result simulated in the simulator 300, and an alternative data storage 530 that stores the alternative established in the alternative establisher 400.

The components of the system described above will be described in more detail with reference to the accompanying drawings.

First, the components of the data statistics analyzer 200 will be described below. The data statistics analyzer 200 creates the future year input amount on the basis of the basic year amount when the demand estimation information required to start the simulation is inputted together with the data migrator 210 that previously creates the basic year input data required for the simulation. At this time, when an operation in the input data converter 220 to generate the corresponding data to the simulation input amount data is performed, the input material data is classified as shown in FIG. 2 and created on the basis of Post Type 4.

Figure 2:
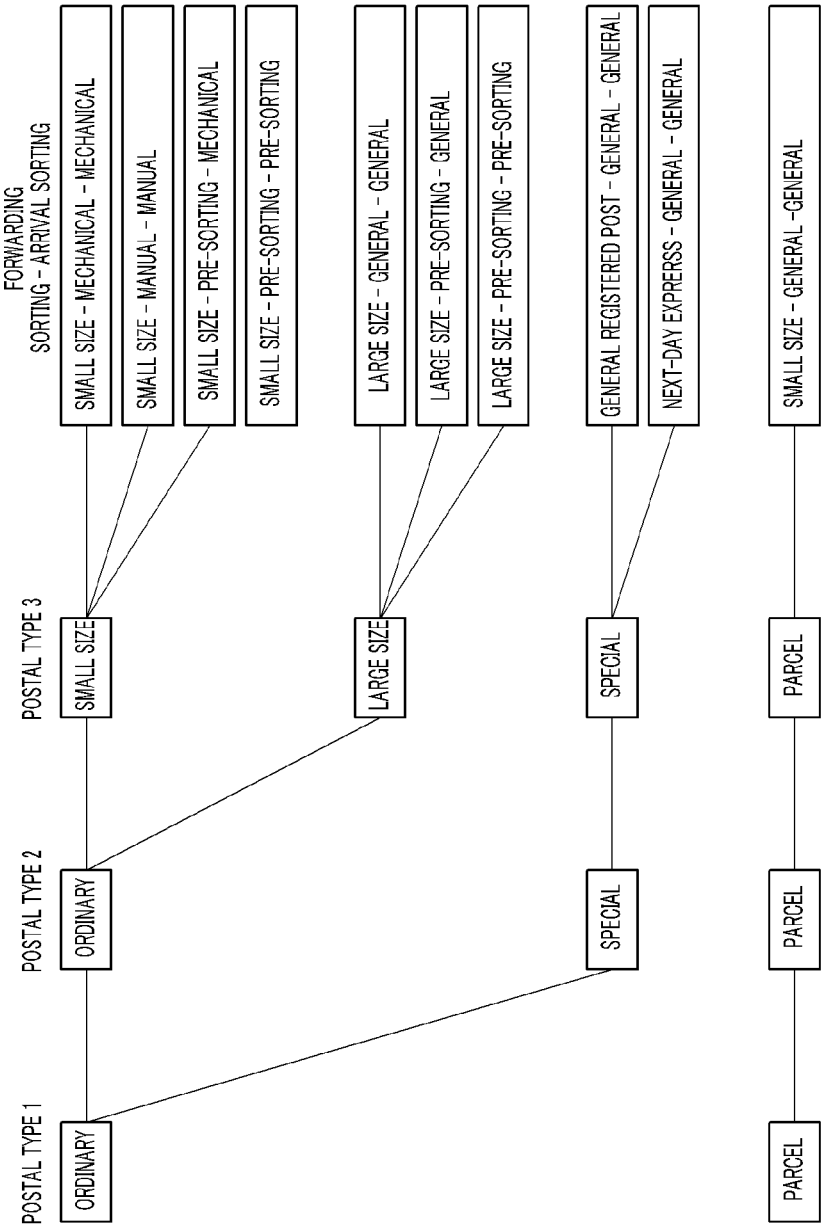
FIG. 2 is an exemplary diagram illustrating a creation reference of input data for each post type according to an embodiment of the present invention.

FIG. 2 is an exemplary diagram illustrating a creation reference of input data for each post type according to an embodiment of the present invention.

As shown in FIG. 2, the post type according to the embodiment of the present invention is largely classified into four types, but is not limited thereto.

The post type is classified into a registered mail or an ordinary mail in a reception book on the post logistics information system. Accordingly, parcels that are registered mail matters, special mail matters, and ordinary mail matters are divided by a small size or a large size to generate input data for each strong point for the simulation. In the case of a criterion of a postal work condition, the small-size ordinary post is divided into manual, mechanical, and pre-sorting. The pre-sorting post amount is created by being divided into pre-sorting mail 1 and pre-sorting mail matter 2 to meet a forwarding sorting working condition and an arrival sorting working condition.

In the case of a large-size ordinary post, the same condition as a small-sized postal amount calculation criterion is reflected to the pre-sorting mail matters and the remaining postal matters are calculated on the basis of a general amount calculation criterion. In addition, the amount data for the demand estimation is generated on the basis of Post type 2, and an amount for each year and each strong point is created to be used at the time of creating a demand estimation value. Further, when the mechanical amount is present, the large-size ordinary post may be defined similarly as the small-size ordinary post.

During such a performing process, in order to calculate an amount for providing input data for the simulation by extracting the postal amount information indicated by the registered mail in the reception book on the post logistics information system from the post logistics information system, the registered mail input data converter 221 which is a component of the input data converter 220 according to the embodiment of the present invention is used, and will be described with reference to FIG. 3.

Figure 3:
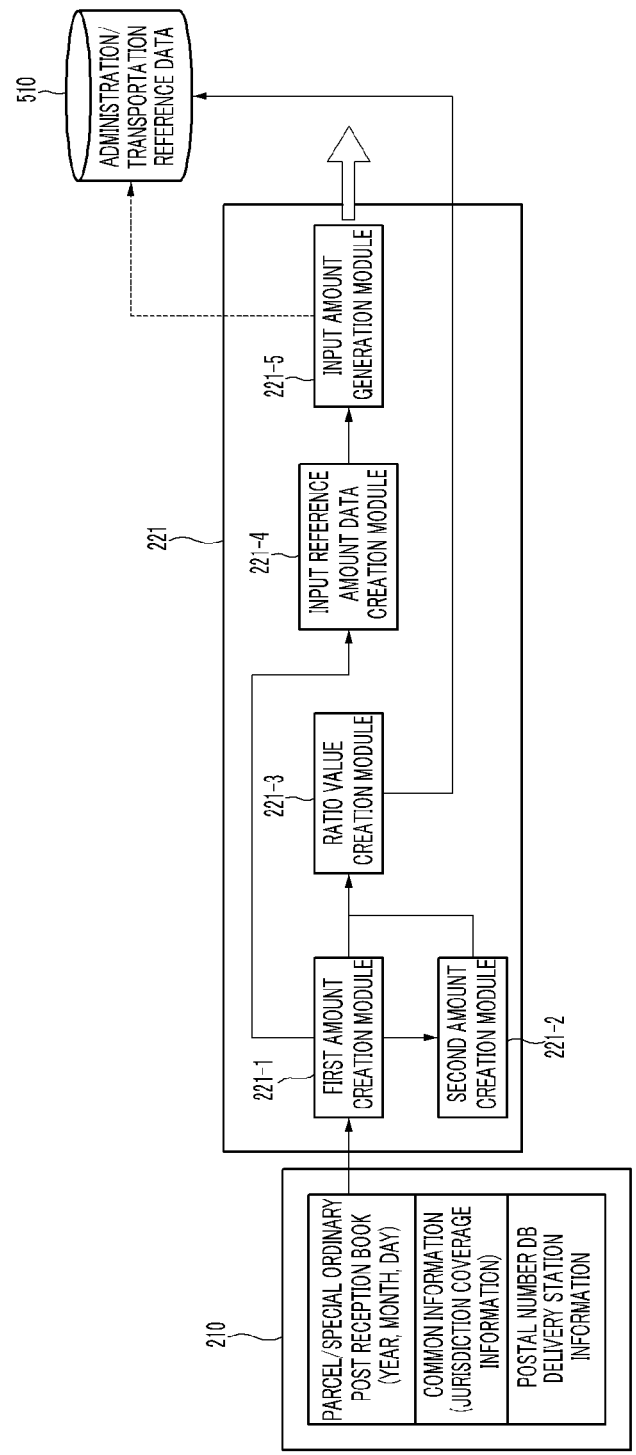
FIG. 3 is an exemplary diagram of a structure of a registered mail matter input data converter of an input data converter according to an embodiment of the present invention.

FIG. 3 is an exemplary diagram of a structure of a registered mail matter input data converter of an input data converter according to an embodiment of the present invention.

As shown in FIG. 3, the registered mail matter input data converter 221 according to the embodiment of the present invention includes a first amount generation module 221-1, a second amount generation module 221-2, a ratio value creation module 221-3, an input reference amount data creation module 221-4, and an input amount generation module 221-5.

The first amount generation module 221-1 extracts and stores each amount data for each reception strong point/each type/each day among the data received from a registered mail matter daily account reception book of the post logistics information system and converted by the data migrator 210. In addition, a reception amount is created and stored for each control station/each day by using a station symbol code value for registering the delivery station that coincides with a postal number of a recipient, corresponding to a serial number of a recipient address in the registered mail matter reception book of the post logistics information system. Further, a daily account amount value and a timely account amount value are created, and an amount ratio value for each time is created and stored.

The second amount generation module 221-2 creates and stores amount values of a first control station (or forwarding control station) and a second control station (or arrival control station) by the performing result of the first amount generation module 221-1.

When the input reference amount data creation module 221-4 receives a message including future year simulation period information, future year increase ratio value information, and simulation performance request information from the user interface 100, the input reference amount data creation module 221-4 creates the input reference amount data for each strong point with respect to a period for performing simulation for each corresponding date.

The input amount generation module 221-5 performs an operation of generating a basic year amount to a simulation input amount in the case of basic year simulation, and generates the simulation input amount after the operation of the second amount generation module 221-2 or the input reference amount data creation module 221-4 is completed when an increase value of the future year amount exists.

Figure 4:
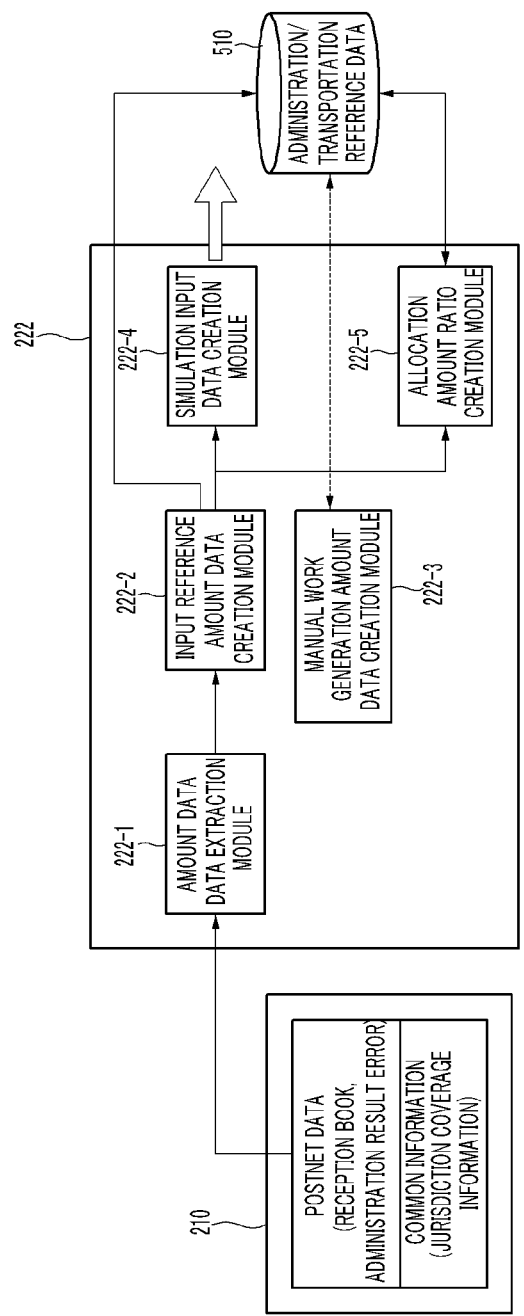
FIG. 4 is an exemplary diagram of a structure of an ordinary mail matter input data converter of an input data converter according to an embodiment of the present invention.

During the above-mentioned performing process, in order to perform the amount calculation process for providing input data for the simulation by extracting the postal amount information indicated by the ordinary mail in the reception book on the post logistics information system from the post logistics information system, the ordinary mail matter input data converter 222 which is a second component of the input data converter 220 according to the embodiment of the present invention is used, and will be described with reference to FIG. 4.

FIG. 4 is an exemplary diagram of a structure of an ordinary mail matter input data converter of an input data converter according to an embodiment of the present invention.

As shown in FIG. 4, the ordinary mail matter input data converter 222 according to a second embodiment of the present invention includes an amount data extraction module 222-1, an input reference amount data creation module 222-2, a manual work generation amount data creation module 222-3, a simulation input data creation module 222-4, and a delivery amount ratio creation module 222-5.

The amount data extraction module 222-1 extracts and stores amount data for each strong point, each day, each post type, and each working condition. Herein, the amount data for each strong point, each day, each post type, and each working condition means data which is generated by the ordinary mail matter reception book of the post logistics information system by processing an amount for each post type at each reception strong point for each day, each day of the week, each special communication period, or each working condition.

The input reference amount data creation module 222-2 creates and stores a ratio value on the basis of a forwarding/arrival/distribution amount value for each strong point from administration amount data in the registered mail matter reception book of the post logistics information system. In addition, the input reference amount data creation module 222-2 creates and stores amount values of the first control station and the second control station. At this time, when the future year amount input data is not transmitted from the user interface 100, the manual work generation amount generation data creation module 222-3 may be called.

When the allocation amount ratio creation module 222-5 acquires a request message including the future year simulation period information, the future year increase ratio value information, and the simulation performing request information from the user interface 100, the allocation amount ratio creation module 222-5 creates the input reference amount data for each strong point with respect to a period in order to simulate the corresponding day.

When a manual work generation amount ratio value after mechanical work is provided, which is created and stored from the sorting facility administration result data acquiring function among the data of the post logistics information system, the manual work generation amount data creation module 222-3 creates and stores an additional manual work generation amount by multiplying the mechanical work amounts and manual work amounts for each strong point by the amount ratio value.

For this, it is determined whether or not the manual work generation amount ratio value after the sorting mechanical work is provided, which is created from the administration data, and when the manual work generation amount ratio value is not provided, the manual work generation amount data creation module 222-3 requests calculation of the additional manual work generation amount to the sorting facility administration result data. Thereafter, when the manual work generation amount ratio value is generated from the sorting facility administration result data after the mechanical work, the additional manual generation amount is created by multiplying the mechanical work generation amount for each strong point by the value.

The simulation input data creation module 222-4 is notified of simulation start information from the input reference amount data creation module 222-2, and generates the simulation start information to the simulation input amount on the basis of a uniform distribution value of the basic year input amount in the case of the basic year simulation. At this time, when the future year amount increase value is provided, an operation of the delivery amount ratio creation module 222-5 is completed and the simulation input amount is created on the basis of the uniform distribution value.

Next, among the system structures described in FIG. 1, a structure of the administration and transportation reference data converter 223 of the input data converter 220 which can be provided by extracting the administration reference data required to perform the simulation function from the post logistics information system will be described with reference to FIG. 5.

Figure 5:
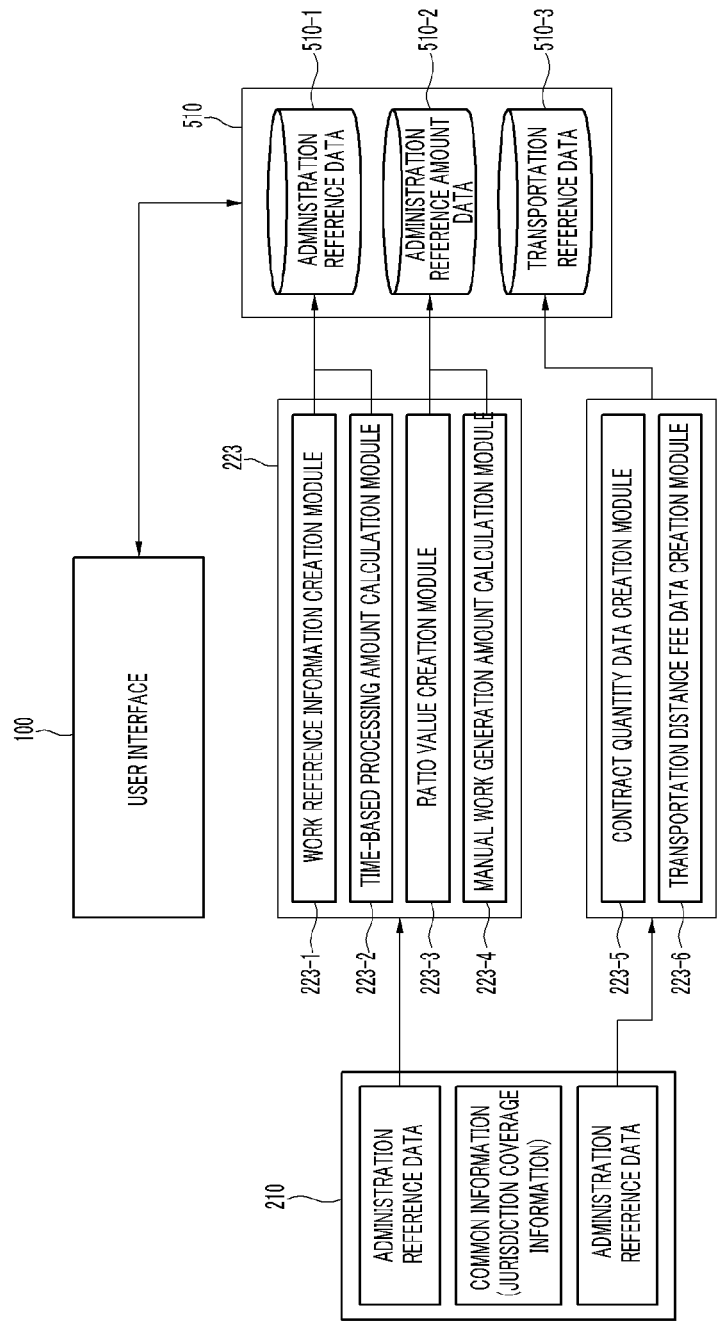
FIG. 5 is an exemplary diagram of a structure of an administration and transportation reference data converter of an input data converter according to an embodiment of the present invention.

FIG. 5 is an exemplary diagram of a structure of an administration and transportation reference data converter of an input data converter according to an embodiment of the present invention.

As shown in FIG. 5, the administration and transportation reference data converter 223 includes a work reference information creation module 223-1 that acquires administration data, a time-based processing amount calculation module 223-2, a ratio value creation module 223-3, a manual work generation amount calculation module 223-4, a contract quantity data creation module 223-5 that acquires transportation data, and a transportation distance fee data creation module 223-6.

The work reference information creation module 223-1 extracts information on a type and a processing ability, and a sorting work condition reference of a sorting facility for each strong point, from information inputted from the administration and management data of the post logistics information system and converted in the data migrator 210, and transmits and stores the extracted information to and in the administration/transportation reference data storage 510. As shown in FIG. 5, the administration/transportation reference data storage 510 includes an administration reference data storage 510-1, an administration reference amount data storage 510-2, and a transportation reference data storage 510-3. The information extracted by the work reference information creation module 223-1 is stored in the administration reference data storage 510-1.

The time-based processing amount calculation module 223-2 acquires processing ability data for each time in order to refer to a case in which a user inputs the processing ability of the sorting facility for each strong point from information that is inputted from the administration and management data of the post logistics information system and converted by the data migrator 210. In addition, a time-based processing amount value of the sorting facility for each strong point is generated on the basis of the acquired data, and is transmitted and stored to and in the administration reference data storage 510-1.

The ratio value creation module 223-3 creates the forwarding/arrival/distribution amount and ratio value for each strong point from the information that is inputted from the administration and management data of the post logistics information system and converted by the data migrator 210. The created forwarding/arrival/distribution amount and ratio value for each strong point are transmitted to and stored in the administration reference amount data storage 510-2.

The manual work generation amount calculation module 223-4 creates a ratio value of an amount that cannot be mechanically processed to be generated as a manual amount among amounts supplied for mechanical processing through the sorting facility for each strong point from the information that is inputted from the administration and management data of the post logistics information system and converted by the data migrator 210. The created amount ratio value is transmitted to and stored in the administration reference amount data storage 510-2. In addition, the manual work generation amount is calculated after mechanical processing for each strong point, and the calculated information is also transmitted to and stored in the administration reference amount data storage 510-2.

The contract quantity data creation module 223-5 acquires contract quantity data for a parcel pallet from the information that is inputted from the administration and management data of the post logistics information system and converted by the data migrator 210 in order to perform the simulation process for acquiring the transportation for extracting and providing the transportation reference data required to perform the simulation function from the post logistics information system. The acquired contract quantity data for the parcel pallet is transmitted to and stored in the transportation reference data storage 510-3.

The transportation distance fee data creation module 223-6 acquires the transportation fee data from the information that is inputted from the administration and management data of the post logistics information system and converted by the data migrator 210. In addition, the acquired data is transmitted to and stored in the transportation reference data storage 510-3.

Next, among the system structures described in FIG. 1, a structure of the demand estimation and future postal amount generator 224 that generates and provides the demand estimation amount for establishing the alternative through analysis of an infrastructure load on the basis of the future year will be described with reference to FIG. 6.

Figure 6:
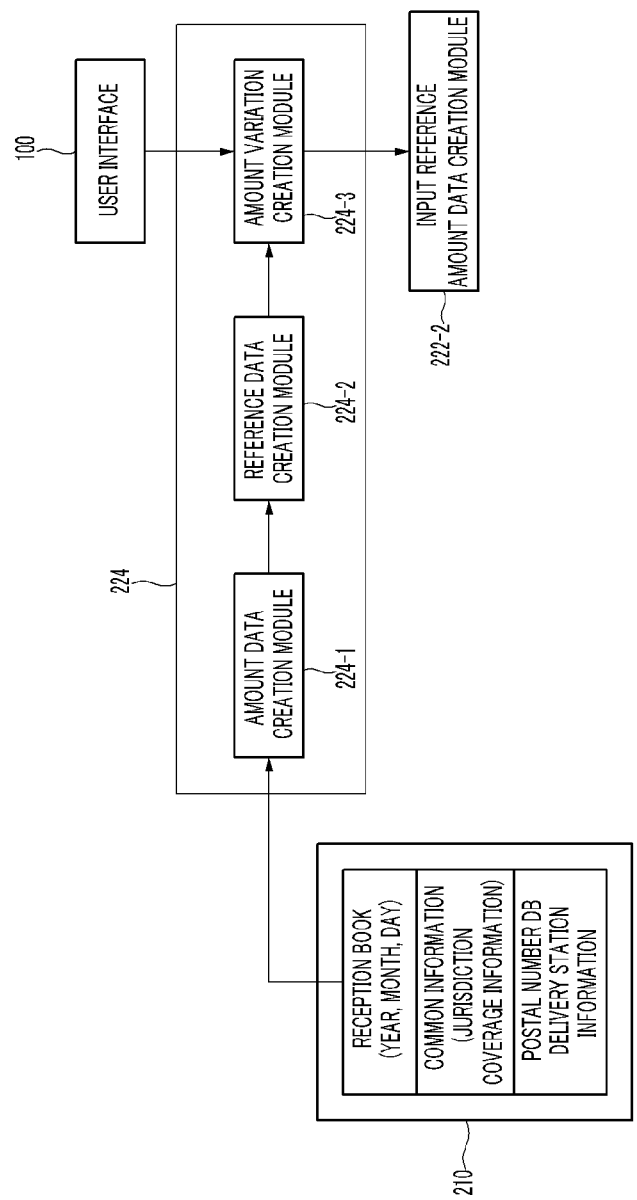
FIG. 6 is an exemplary diagram of a structure of a demand estimation and future postal amount generation module of an input data converter according to an embodiment of the present invention.

FIG. 6 is an exemplary diagram of a structure of a demand estimation and future postal amount generation module of an input data converter according to an embodiment of the present invention.

As shown in FIG. 6, the demand estimation and future postal amount generator 224 includes an amount data creation module 224-1, a reference data creation module 224-2, and an amount variation creation module 224-3.

The amount data creation module 224-1 calculates a daily account amount or a monthly amount for each strong point on the basis of the reception book daily account amount data of the post logistics information system. The reference data creation module 224-2 calculates an amount for each strong point and for each year by using a daily amount calculation result for each strong point, which is calculated by the amount data creation module 224-1. Herein, the strong point represents a controls station or Korea Post, but is not limited thereto.

The amount variation creation module 224-3 creates and stores a national compound annual growth rate (CAGR) or a CAGR for each office by using past year amount data and a newly generated reference variable amount value in order to calculate the demand estimation and future postal amount in the input data converter 220. Further, the amount variation creation module 224-3 receives the demand estimation information from the user interface 100, and the amount variation creation module 224-3 creates an amount variation rate.

At this time, in order to create the amount variation rate, an amount increase/decrease rate data for each post type and each logistics strong point stored in the information storage 500 in driving the simulator 300 is provided to the user, and when increase/decrease rate values for each post type, each national demand estimation increase/decrease rate, and each office are acquired, a future year amount variation rate for each strong point is created. Thereafter, when the CAGR value for each office is acquired from the user interface 100, the future year amount variation rate for each strong point is created after the CAGR value is compensated so that an estimation amount account value for each Korea Post by the increase/decrease rate value for each Korea Post coincides with a national total amount value in order to coincide with a national demand estimation amount value, and the future year amount variation rate for each strong point is created.

When the amount variation rate value for the future year is created, information on the created future year amount variation rate is provided to the input amount creation modules 221-4 and 222-2 that are positioned in the registered mail matter input data converter 221 and the ordinary mail matter input data converter 222, respectively.

Next, among the system structures described in FIG. 1, a structure of the output data converter 230 will be described with reference to FIG. 7, which converts results of detailed load analysis, vehicle requirement analysis, and communication quality analysis into output data so as to provide the results to the user by using the infrastructure load analysis simulation result, and stores the load calculation result for each mailing in the information storage 500 and provides the results through the user interface 100 when the infrastructure load analysis simulation is completed.

Figure 7:
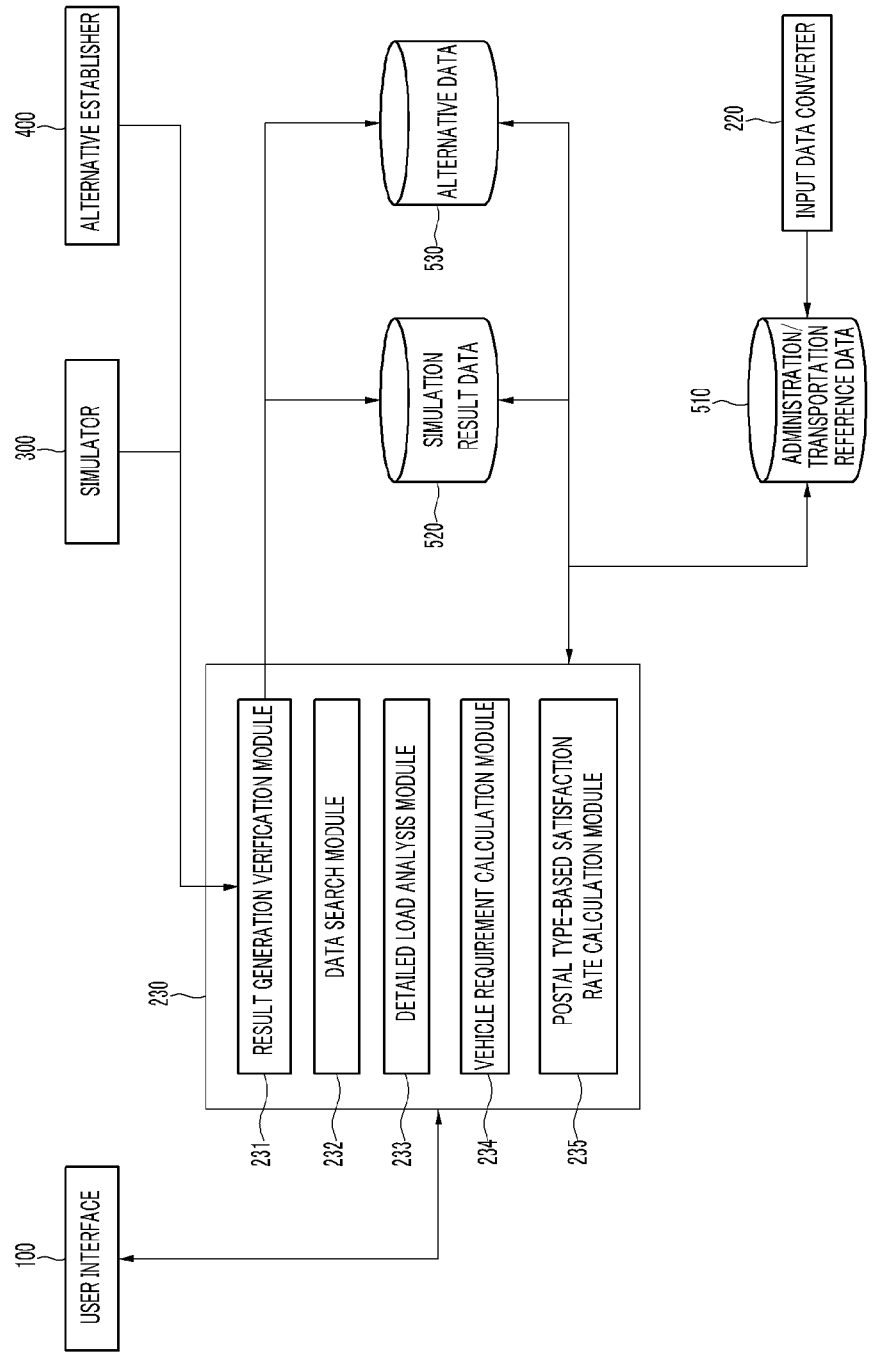
FIG. 7 is a structure diagram of an output data converter according to an embodiment of the present invention.

FIG. 7 is a structure diagram of an output data converter according to an embodiment of the present invention.

As shown in FIG. 7, the output data converter 230 according to the embodiment of the present invention includes a result generation verification module 231, a data search module 232, a detailed load analysis module 223, a vehicle requirement calculation module 234, and a post type-based satisfaction rate calculation module 235.

The result generation verification module 231 transmits and stores the simulation result and the alternative result outputted from the simulator 300 and the alternative establisher 400, respectively, to and in the simulation result data storage 520 and the alternative data storage 530 of the information storage 500.

The data search module 232 searches the administration reference/transportation reference/amount/data for each region that are stored in the result data storage 520 or the alternative data storage 530, and provides the data to the user through the user interface 100.

The detailed load analysis module 223 generally performs a function of calculating an overload ratio and a function of calculating a maximum daily load with respect to logistics strong points. That is, the detailed load analysis module 223 calculates the number of overload days and a ratio value from load values for each central station, each forwarding ordinary post, and each arrival sorting from the simulation result. Further, an average daily load value and a maximum daily load value are calculated from the load values for each central station, each forwarding sorting, and each arrival sorting from the simulation result.

The vehicle requirement calculation module 234 calculates a vehicle requirement degree for each transportation section from the simulation result data with respect to the vehicle requirement analysis, and transmits the calculation result to the information storage 500. Further, the result calculated through the user interface 100 is displayed on a user screen.

Further, an average daily requirement number for each size of vehicles and a maximum daily requirement number of vehicles between strong points may be calculated by using the simulation result. Herein, an average daily transportation expense and a maximum daily transportation expense that are generated during the simulation is calculated in order to calculate the average daily transportation expense and the maximum daily transportation expense.

The post type-based satisfaction rate calculation module 235 calculates a post type-based delivery reference satisfaction rate from the simulation result data with respect to the communication quality analysis and transmits the calculation result to the information storage 500. Further, the result calculated through the user interface 100 is displayed on the user screen.

Next, components of the alternative establisher 400 of FIG. 1 will be described in detail with reference to FIGS. 8 to 10.

Figure 8:
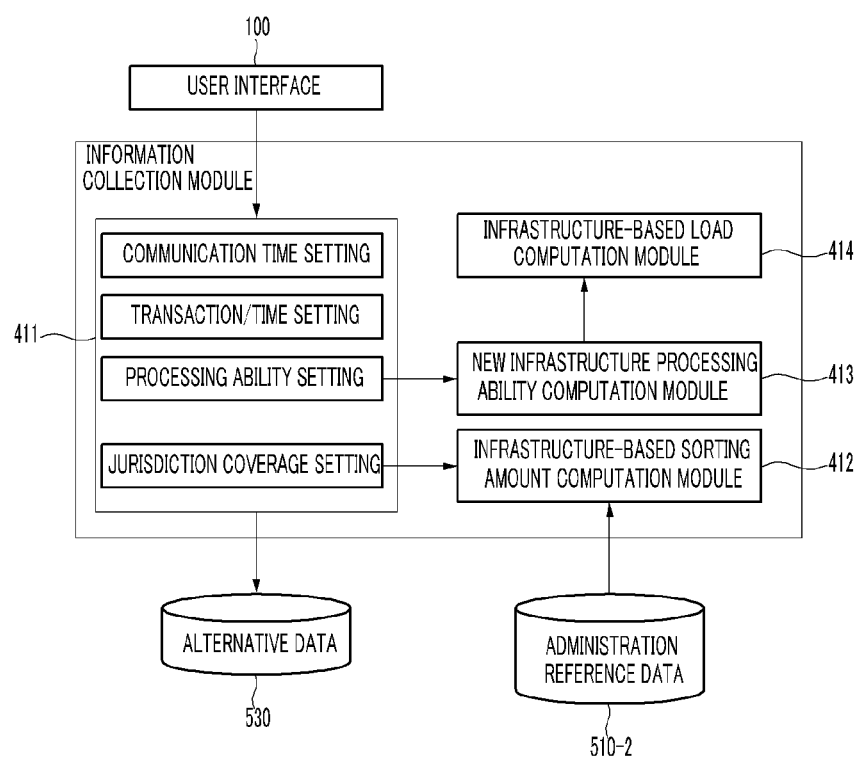
FIG. 8 is a structure diagram of an infrastructure establishing unit of an alternative establishing unit according to an embodiment of the present invention.

FIG. 8 is a structure diagram of an infrastructure establishing unit of an alternative establishing unit according to an embodiment of the present invention. FIG. 9 is a structure diagram of a jurisdiction coverage designer of an alternative establishing unit according to an embodiment of the present invention. FIG. 10 is a structure diagram of a processing ability adjusting function unit of an alternative establishing unit according to an embodiment of the present invention.

First, as shown in FIG. 8, the infrastructure establishing unit 410 according to the embodiment of the present invention receives communication time information and distance/time setting data from the user interface and stores them as reference data for simulating the alternative. In addition, the processing ability setting and jurisdiction setting data are received and an infrastructure-based load is calculated and provided to the user in real time, and an appropriate infrastructure establishment plan is created and provided.

For this, the infrastructure establishing unit 410 includes an information collection module 411, an infrastructure-based sorting amount calculation module 412, a new infrastructure processing ability calculation module 413, and an infrastructure-based load calculation module 414.

The information collection module 411 receives the communication time and distance/time setting data from the user interface 100 and transmits them to the alternative data storage 530 of the information storage 500, and thus, stores the data as the reference data for simulating the alternative. The infrastructure-based sorting amount calculation module 412 and the new infrastructure processing ability calculation module 413 receive the information collected by the information collection module 411 and calculate the infrastructure-based sorting amount degree and the new infrastructure processing ability.

The infrastructure-based load calculation module 414 receives the information calculated by the infrastructure-based sorting amount calculation module 412 and the new infrastructure processing ability calculation module 413 to calculate the infrastructure-based load in real time, and transmit the infrastructure-based load to the user interface 100 to provide the infrastructure-based load to the user.

Figure 9:
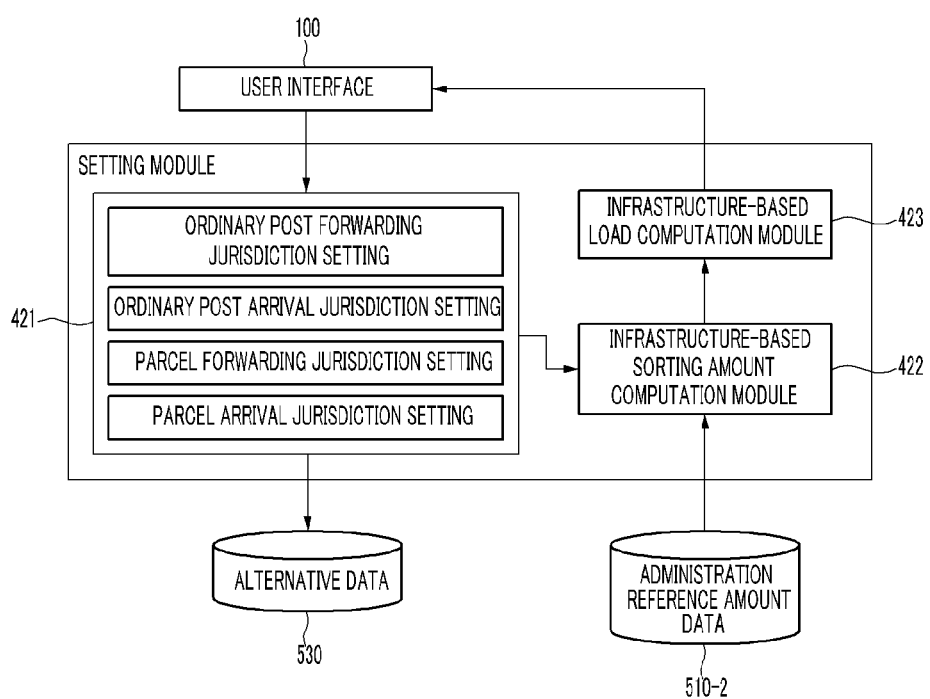
FIG. 9 is a structure diagram of a jurisdiction coverage designing unit of an alternative establishing unit according to an embodiment of the present invention.

Next, as shown in FIG. 9, the jurisdiction coverage designer 420 is used to analyze effects at the time of adjusting the control station that controls ordinary post and forwarding and arrival of parcels of the central station and the logistics center, and includes a setting module 421, an infrastructure-based sorting amount calculation module 422, and an infrastructure-based load calculation module 423.

The setting module 421 receives setting information of ordinary post forwarding jurisdiction, ordinary post arrival jurisdiction, parcel forwarding jurisdiction, and parcel arrival jurisdiction through the user interface 100. Therefore, the infrastructure-based sorting amount calculation module 422 and the infrastructure-based load calculation module 423 calculate the infrastructure-based load in real time depending on changed control data on the basis of the reference amount information and the received information that are stored in the administration reference amount data storage 510-2. In addition, newly calculated infrastructure-based load related information is provided to the user through the user interface 100.

That is, although jurisdictions of the known central station must use both ordinary post and parcel except for some control stations, in the embodiment of the present invention, the jurisdiction of the central station may be set by being divided into an ordinary post forwarding jurisdiction, an ordinary post arrival jurisdiction, a parcel forwarding jurisdiction, and a parcel arrival jurisdiction of the central station for flexibly establishing the alternative.

Figure 10:
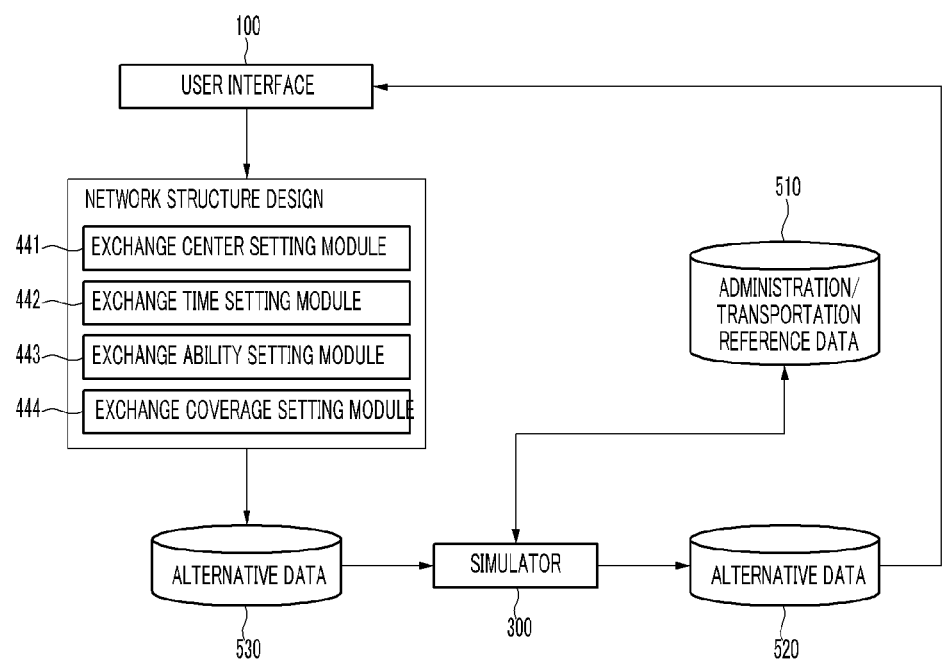
FIG. 10 is a structure diagram of a processing ability adjusting function unit of an alternative establishing unit according to an embodiment of the present invention.

Next, as shown in FIG. 10, the processing ability adjusting function unit 440 changes the functions of the existing central station and logistics center, adjusts the sorting facility and the manual work processing ability, and analyzes a resultant effect of resetting the jurisdiction coverage, and includes an exchange center establishing module 441, an exchange time setting module 442, a processing ability setting module 443, and an exchange coverage setting module 444.

When the modules 441 to 444 of the processing ability adjusting function unit 440 set a network structure for establishing the exchange center, exchange time setting information, a processing ability of the exchange center to be established, and an exchange coverage to be included in the exchange center to be established, the set information are transmitted to and stored in the alternative data storage 530.

That is, a load variation for each logistics strong point is created and provided to the user by receiving the infrastructure function adjusting data, the sorting facility processing ability data, the manual work processing ability data, and the jurisdiction coverage setting data from the user interface 100, such that an appropriate establishment result of the infrastructure processing ability adjusting alternative is provided through the user screen.

Next, the administration process simulator 310 and the transportation process simulator 320 of FIG. 1 will be described with reference to FIG. 11.

Figure 11:
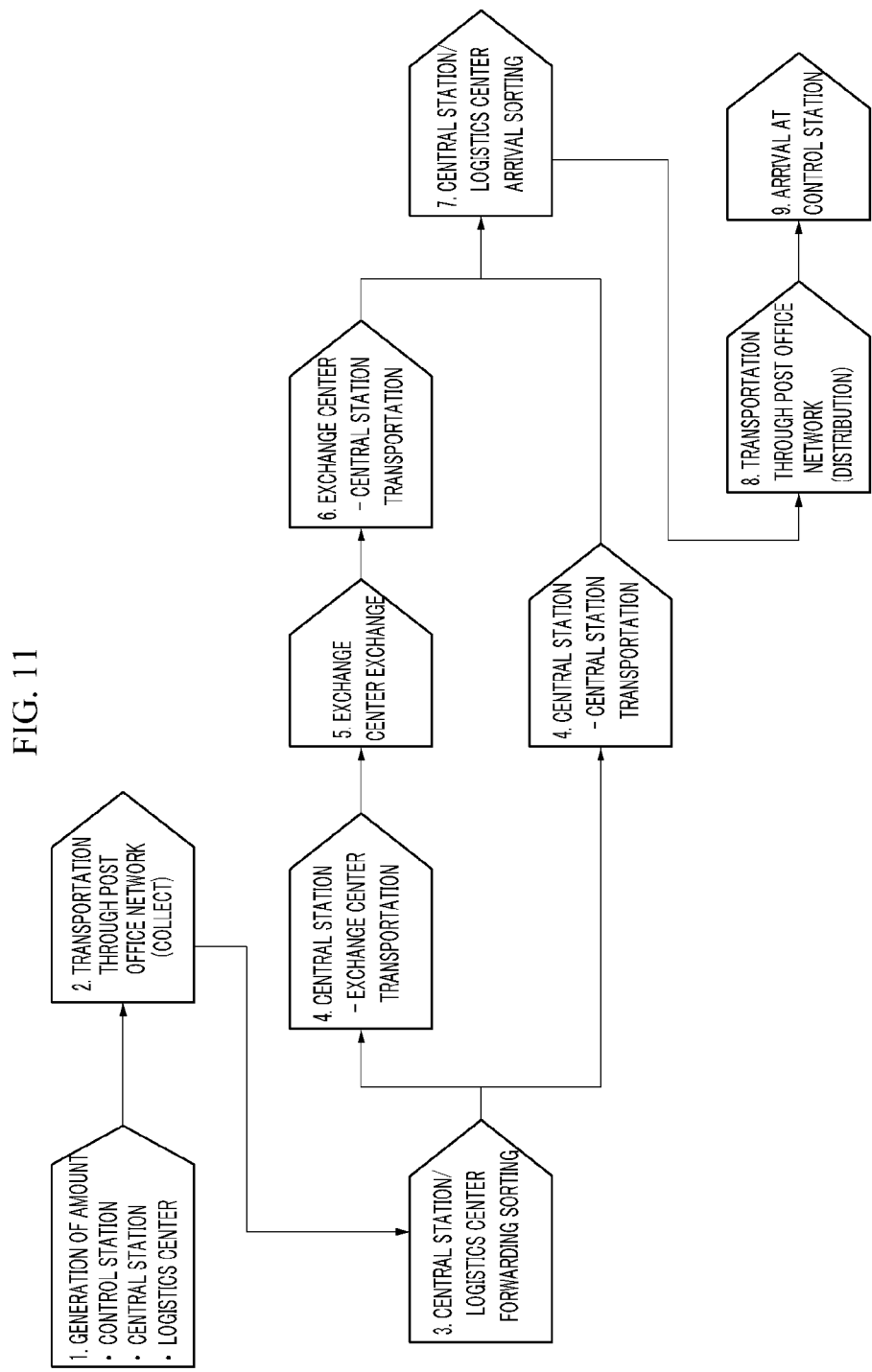
FIG. 11 is an exemplary diagram of an administration process simulator and a transport process simulator according to an embodiment of the present invention.

FIG. 11 is a simulation exemplary diagram of an administration process simulator and a transportation process simulator according to an embodiment of the present invention.

As shown in FIG. 11, the administration process simulator 310 and the transportation process simulator 320 simulate a logistics sorting work process in a strong point that treats logistics and a process for preparing for arrival and forwarding/distribution work between logistics strong points.

When generation of the amount is started from the data statistics analysis function, the administration process simulator 310 performs simulation by the processes for each post type and each working condition that are generated in the logistics strong points, which are provided from reception to delivery.

In addition, ordinary postal matters are used to create amounts for each logistics strong point to be forwarded to the arrival logistics center and the delivery station and forwarded by a distribution amount value. For this, a process of creating the amount for each logistics strong point should be included with respect to the simulation result amount.

The transportation process simulator 320 starts the simulation depending on the administration process result, and simulates a method of selecting and forwarding a transportation vehicle for each destination on the basis of a post type-based postal container conversion ratio value and the number of containers that can be loaded in the transportation vehicle. For this, the transportation process is simulated in the transportation network. A network formed between the exchange center and the central station shown in FIG. 11 is referred to as an exchange network, a network formed between the central station and the logistics center is referred to as a central station network, and a network formed between the central station and the control station is referred to as a post office network.

When the simulation for the transportation process is completed, the number of required vehicles and the transportation expense for the transportation process are calculated for each transportation network, and a simulation result that can compare the alternatives is created by resimulating the transportation process depending on the alternative establishing process.

Next, a method of simulating the infrastructure load analysis through the system having the above-mentioned structure will be described with reference to FIG. 12.

Figure 12:
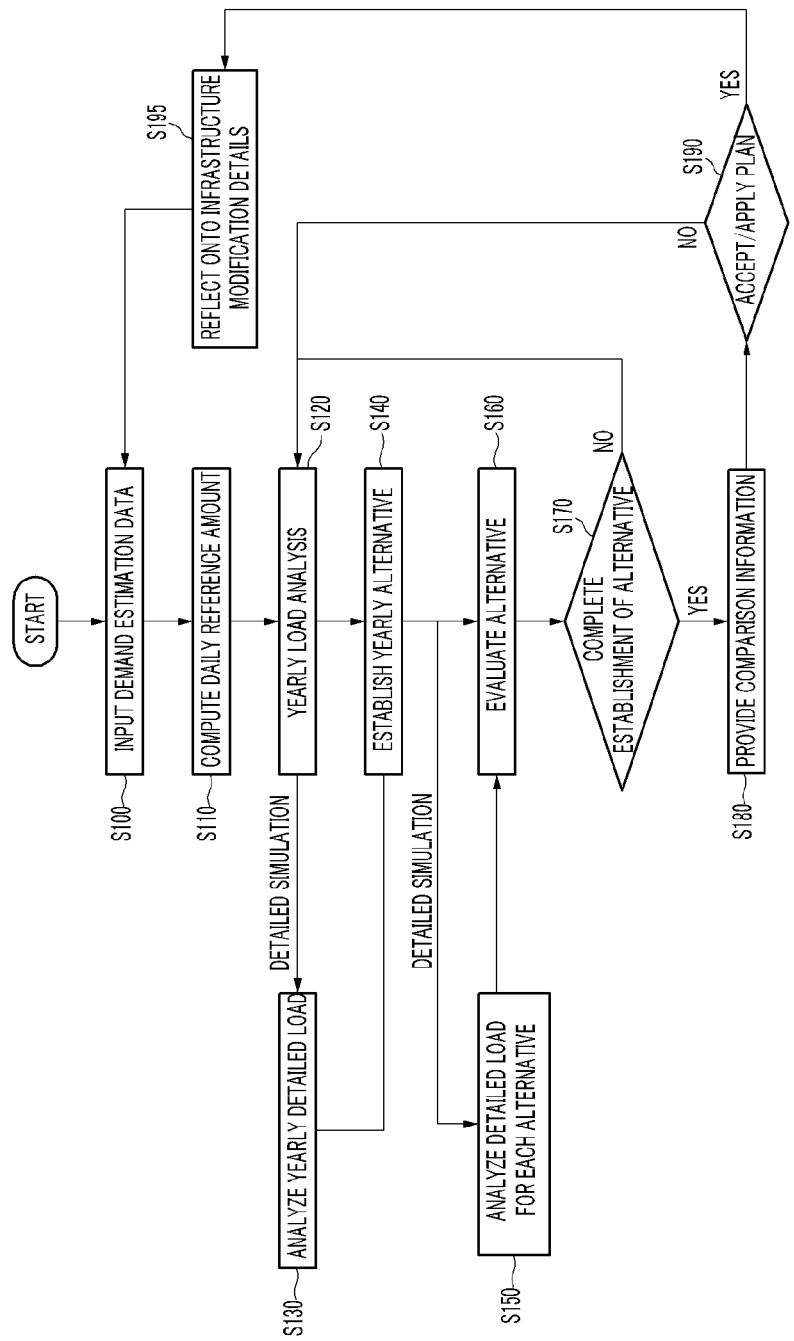
FIG. 12 is a flowchart illustrating a method of simulating analysis of an infrastructure load according to an embodiment of the present invention.

FIG. 12 is a flowchart illustrating a method of simulating analysis of an infrastructure load according to an embodiment of the present invention.

As shown in FIG. 12, an operation of an infrastructure load analysis simulator for establishing and verifying a long-term logistics infrastructure establishment plan by a basic year and a future amount according to an embodiment of the present invention largely includes receiving information, calculating a daily reference amount, and performing yearly load analysis.

More specifically, first, the data input unit 110 of the user interface 100 receives basic year or future year demand estimation data inputted by the user to perform the simulation (S100). At this time, the inputted basic year or future year demand estimation data is data created on the basis of the future amount demand estimation information in addition to a result created by converting reference amount input data for each strong point and each post type, which is created through the input data converter 220 of the data statistics analyzer 200.

Input data is created by converting the inputted data, and a daily reference amount to be stored in the alternative data storage 530 is calculated (S110). At step S110, a case in which the simulation is performed once in the early stage of the system is describe as an example, but is not limited thereto. When the daily reference amount is calculated, the alternative establishment and result inquiring unit 130 performs the yearly load analysis on the basis of the data (S120). At this time, the year load analysis is performed for each office or each central station, and preparation work for performing the simulation is completed at step S120.

Herein, for the demand estimation data that is inputted at step S100, a procedure in which the input data converter 220 converts the inputted data will be described with reference to FIG. 13.

Figure 13:
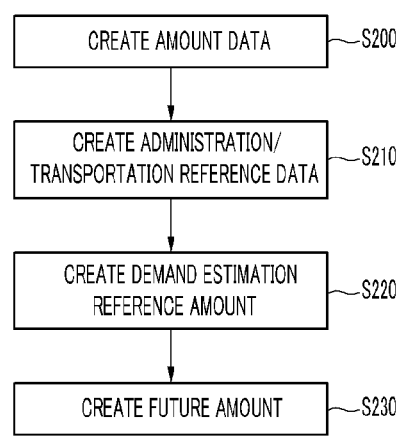
FIG. 13 is a flowchart illustrating an input data converting procedure of a data converter according to an embodiment of the present invention.

FIG. 13 is a flowchart illustrating an input data converting procedure of a data converter according to an embodiment of the present invention.

As shown in FIG. 13, the input data converting procedure includes an amount data creation step (S200), an administration/transportation reference data creation step (S210), a demand estimation reference amount creation step (S220), and a future amount creation step (S230).

Figure 14A:
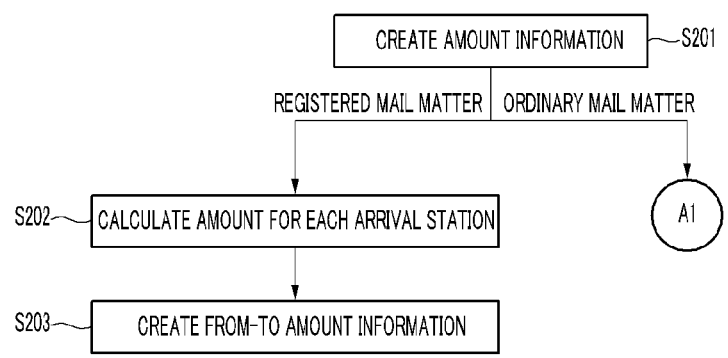
FIG. 14A is a flowchart illustrating a process of creating registered mail amount data according to an embodiment of the present invention.
Figure 14B:
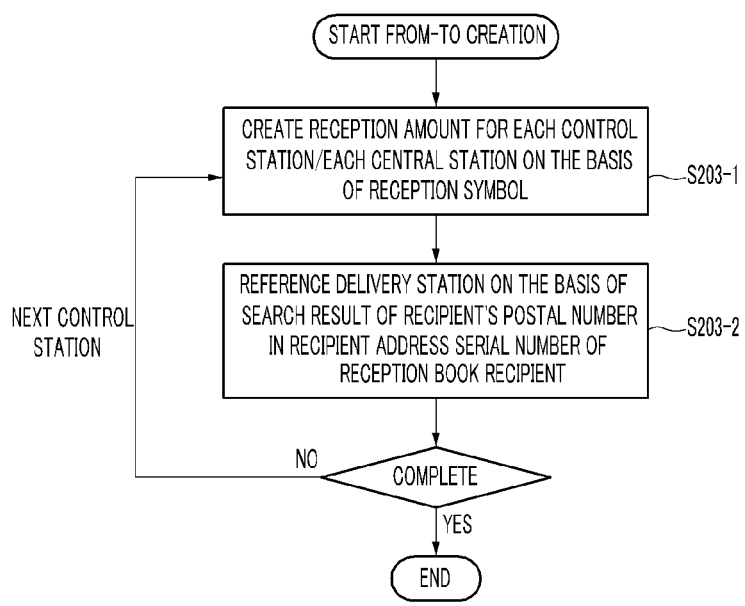
FIG. 14B is a flowchart illustrating a method of creating from-to amount information according to an embodiment of the present invention.
Figure 14C:
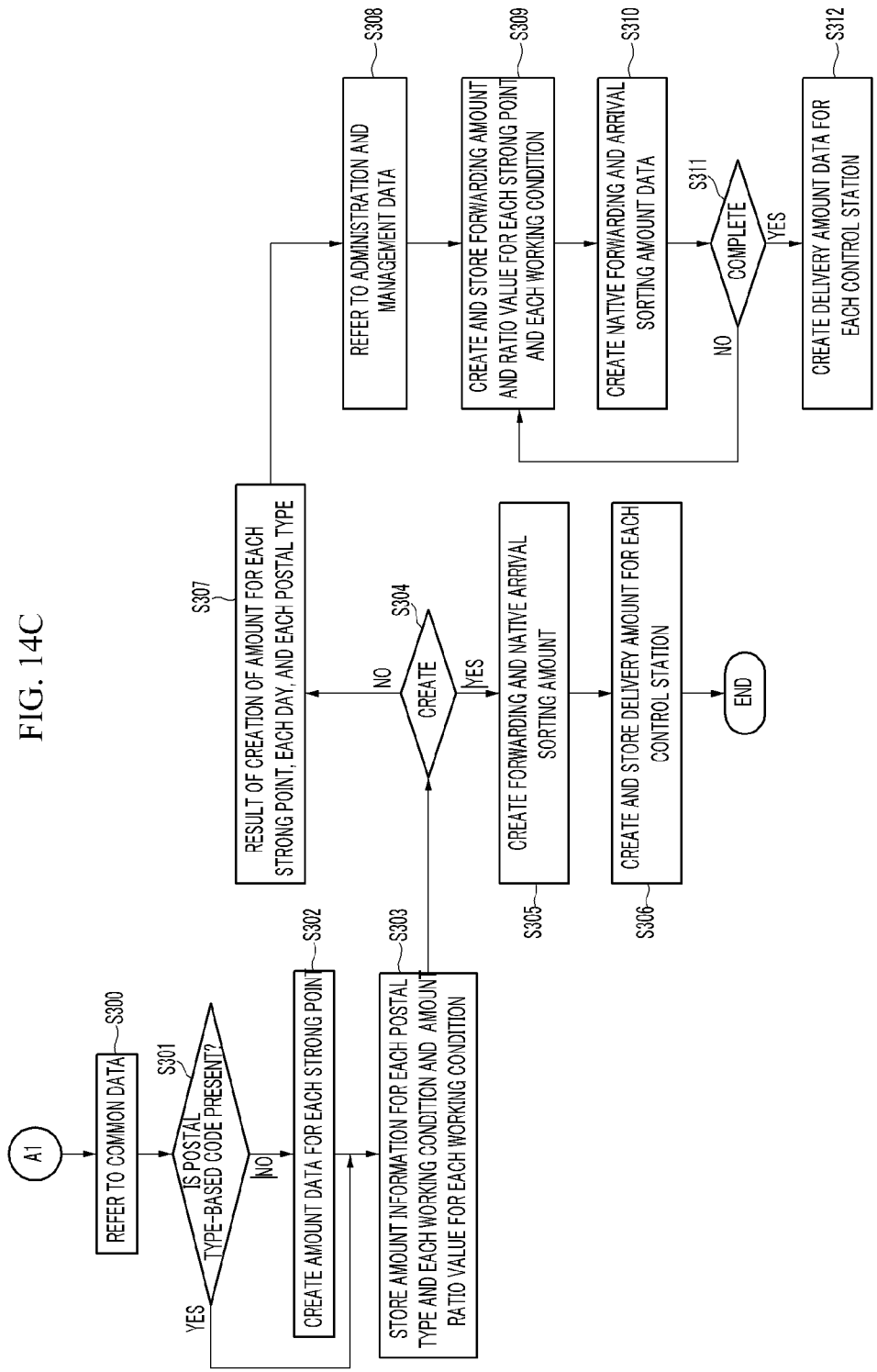
FIG. 14C is a flowchart illustrating a process of creating ordinary mail amount data according to an embodiment of the present invention.

Each step will be described in detail below. First, the amount data creation step (S200) may largely include a registered mail amount data creation process, an ordinary mail amount data creation process, and a forwarding station-reception station amount information creation process, as shown in FIGS. 14A to 14C. FIG. 14A is a flowchart illustrating a registered mail amount data creation process according to an embodiment of the present invention, and FIG. 14B is a flowchart illustrating a method of creating forwarding station-reception station amount information according to an embodiment of the present invention. In addition, FIG. 14C is a flowchart illustrating a process of creating ordinary mail amount data according to an embodiment of the present invention.

In general, a registered mail matter creates simulation input data by a reception amount value for each time. Like the ordinary mail matter, in the case in which the amount information for each reception time is not calculated, the input data is evenly distributed.

That is, as shown in FIG. 14A, in the registered mail amount data creation process, the first amount creation module 221-1 of the registered mail matter input data converter 221 creates amount information for each logistics strong point/each type/each day/each time on the basis of the amount information for each reception strong point/each type/each day created in the reception book of the postal logistics information system (S201). At this time, an amount ratio value for each time is also created.

When the first amount creation module 221-1 creates the amount information for each logistics strong point/each type, the ratio value creation module 221-3 calculates the amount for each arrival nation by a recipient's postal number, and creates and stores from (reception amount of reception control station)—to (amount scheduled to arrive at delivery control station) amount information (amount, ratio value) by the input reference amount data creation module 221-4 on the basis of the calculation result.

Herein, a detailed method in which the input reference amount data creation module 221-4 creates the forwarding station-reception station amount information is shown in FIG. 14B. FIG. 14B is a flowchart illustrating a method of creating a forwarding station-reception station amount information according to an embodiment of the present invention.

As shown in FIG. 14B, the input reference amount data creation module 221-4 creates the reception amount information for each control station/each central station on the basis of the reception station symbol (S203-1). At this time, the reception amount information for each control station/each central station is the same as the amount information created for each reception strong point/each type/each day in the reception book of the postal logistics information system. Thereafter, as a result of searching the recipient's postal number from a recipient address serial number of the reception book recipient, reference delivery amount information on the basis of a reference delivery station is created (S203-2).

Next, aside from the registered mail amount data creation process described in FIG. 14A in the amount data creation step (S200), the ordinary mail amount data creation process, which is another procedure, is shown in FIG. 14C. FIG. 14C is a flowchart illustrating a process of creating ordinary mail amount data according to an embodiment of the present invention.

As shown in FIG. 14C, the amount data extraction module 222-1 identifies whether or not a collected postal type code is an affiliated control station or an affiliated central station by referring to common data (that is, jurisdiction coverage information) in which a relationship between logistics strong points is defined (S300). The postal type code is a code based on reception station identifiers (i.e., station symbol for registration, etc.) created in the ordinary mail matter reception book of the postal logistics information system for identification.

The amount data extraction module 222-1 can know whether the corresponding ordinary mail matter is a postal matter received in the affiliated control station or a postal matter received in the affiliated central station by determining whether the collected postal type code is stored in the ordinary mail matter reception book of the postal logistics information system (S301). Thereafter, when it is determined that the postal matter does not belong to the affiliated control station or the affiliated central station, that is, when the postal type code is not stored in the ordinary mail matter reception book of the postal logistics information system, the amount data for each strong point for the corresponding ordinary mail matter is created and stored (S302).

In addition, when creation of the amount data for each strong point from the input reference amount data creation module 222-2 is completed, the allocation amount ratio creation module 222-5 creates and stores the amount information for each postal type and each working condition and an amount ratio value for each working condition on the basis of the previously set postal type code and a curtailment and additional curtailment reference code value that are previously set as the administration reference data for the simulation (S303).

It is determined whether or not creation of the amount information for each strong point, each day, each postal type, each working condition, and each amount information and the amount ratio value data for each working condition is completed from the delivery amount ratio creation module 222-5 (S304). If the creation of the amount information and the amount ratio value data is completed, the simulation input data creation module 222-4 creates and stores a delivery amount for each control station (S306) after creating forwarding and native arrival sorting amounts (S305).

However, at step S304, when it is determined that the creation is not completed, a ratio value and postal type-based control station and central station arrival, and a central station reception amount account value, are created on the basis of forwarding/arrival/distribution amount value information for each strong point in the administration reference amount data (S307).

In addition, the manual work generation amount data creation module 222-3 creates and stores the forwarding amount and ratio value for each strong point and each working condition (S309) by referring to the administration and management data (S308). Thereafter, a difference between values of amounts that are forwarded at the same time is created as native forwarding arrival sorting amount data (S310).

It is determined whether or not creation of delivery amount data for each control station is completed (S311), and when the creation is completed, another station arrival amount value is added to the created native forwarding/arrival sorting amount data and the delivery amount data for each control station (or delivery station) is created and stored in the information storage (S312).

However, as the determination result at step S311, when the creation is not completed, steps S309 and S310 are repeatedly performed until the creation is completed.

Next, the administration/transportation reference data creation step (S210) of FIG. 13 will be described with reference to FIGS. 15A to 15D.

FIGS. 15A to 15D are flowcharts illustrating a procedure of creating administration/transportation reference data according to an embodiment of the present invention.

In the administration and transportation reference data creation step, the administration and transportation reference data converter 123 extracts reference data to be used as simulation administration and transportation reference data by referring to transportation plan information, actual result data, sorting facility reference information, administration and management information, and data relating to generation of manual amount for mechanical processing amount which are transportation reference data among data of the postal logistics information system (S211-1). In the embodiment of the present invention, the data of the postal logistics information system, which is used for data extraction, is described above, but is not limited thereto.

Figure 15A:
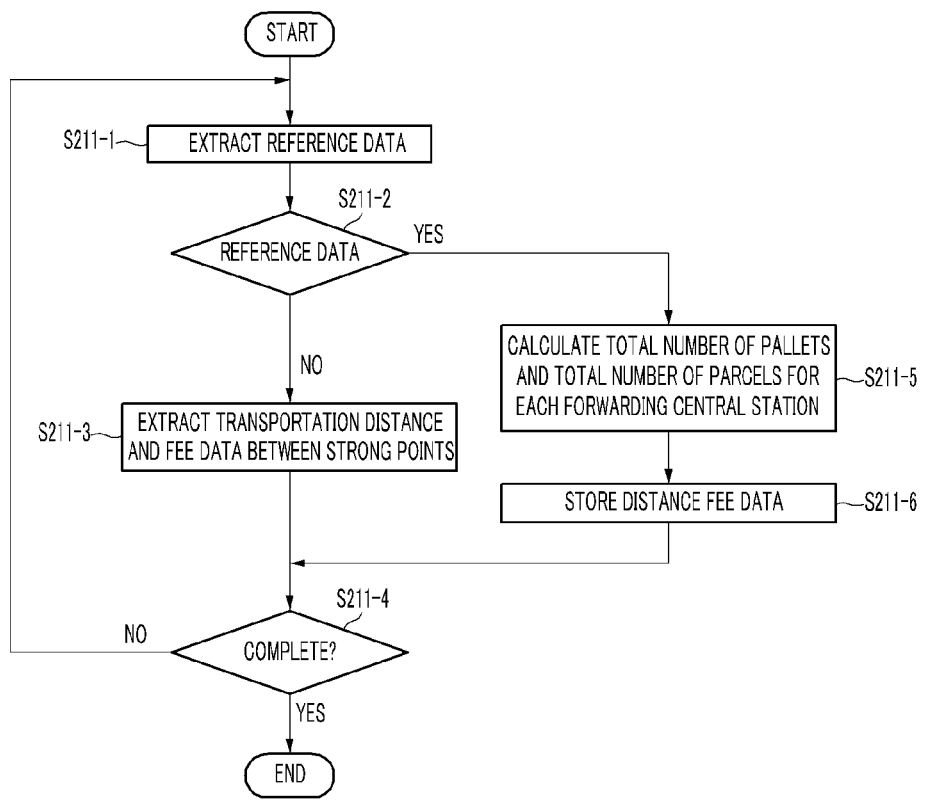
FIGS. 15A to 15D are flowcharts illustrating a procedure of creating administration/transportation reference data according to an embodiment of the present invention.

First, as shown in FIG. 15A, the work reference information creation module 223-1 determines whether or not reference data is extracted from the transportation plan data and the actual result data among the data received from the postal logistics information system (S211-2). If the reference data is extracted, the contract quantity data creation module 223-5 acquires the transportation data from the reference data, and for this, the contact quantity data creation module 223-5 calculates the total number of pallets and the total number of parcels for each forwarding central station by using the reference data acquired from data of a contract book (S211-5).

In addition, the contract quantity data creation module 223-5 calculates a parcel conversion reference per pallet by using the calculated total number of pallets and the calculated total number of parcels, and acquires transportation fee data from a previously stored distance fee table data. Thereafter, the transportation distance fee data creation module 223-6 acquires a distance fee table data registered in the information storage 500, and stores the acquired distance fee table data in the information storage 500 (S211-6).

On the contrary, when it is determined that the reference data is not extracted at step S211-2, the manual work generation amount calculation module 223-4 extracts and registers data of a transportation distance and fee between strong points (S211-3). It is determined whether or not the total number of pallets and the total number of parcels for each forwarding central station are calculated (S211-4), and when it is determined that the total number of pallets and the total number of parcels for each forwarding central station are not yet calculated, the steps following step S211-1 are again performed and repeated until the total number of pallets and the total number of parcels for each forwarding central station are extracted.

Figure 15B:
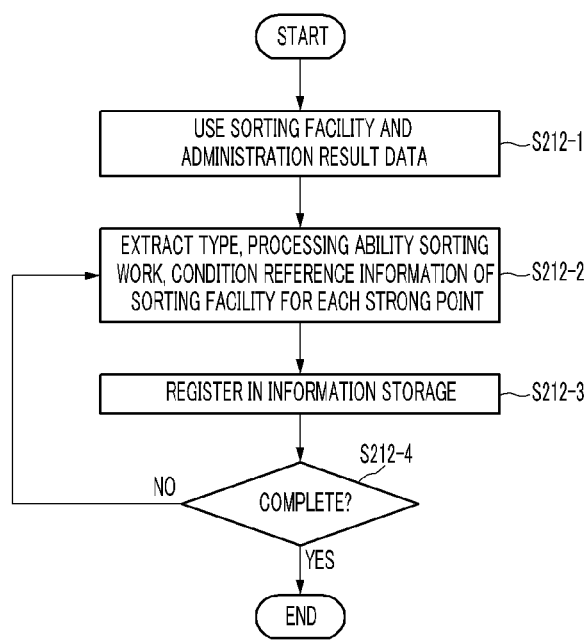

Next, as shown in FIG. 15B, sorting facility reference information among the data received from the postal logistics information system is used (S212-1). The work reference information creation module 223-1 and the time-based processing amount calculation module 223-2 extracts the type of sorting facility for each strong point, a processing ability, and sorting work condition reference information, and stores them in the information storage 500 (S212-2).

Thereafter, when the information on the processing ability of the sorting facility in the administration reference data is inputted by the user, the time-based processing amount calculation module 223-2 that acquires the time-based processing ability data extracts a sorting facility name for each strong point, the number of facilities, and the processing ability reference data from the reference data for the sorting facility for each strong point, and stores them in the information storage 500 (S212-3). It is determined whether or not registration of the data in the administration reference data information storage 510 is completed (S212-4), and the steps following step S212-1 is repeatedly performed until amount information for each strong point, each sorting facility, and each time is extracted and storage of the amount information is completed.

Figure 15C:
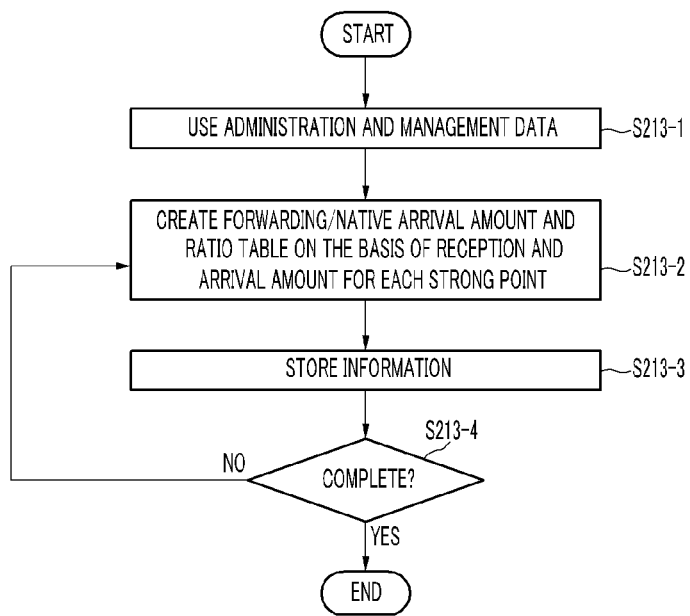

Next, as shown in FIG. 15C, in order to create the reference information used to create the forwarding station-reception station amount information of the ordinary mail matter by using the administration and management data received from the postal logistics information system (S213-1), the ratio value creation module 223-3 creates a ratio table by using a daily account amount value for forwarding, arrival, and distribution amounts for each working condition, for each strong point in the administration and management table of the postal logistics information system (S213-2).

Thereafter, the ratio table is created as a file for each strong point or stored in the information storage (S213-3). It is verified whether or not the procedure is completed (S213-4), and the steps following step S213-1 is repeatedly performed until the procedure is completed.

Figure 15D:
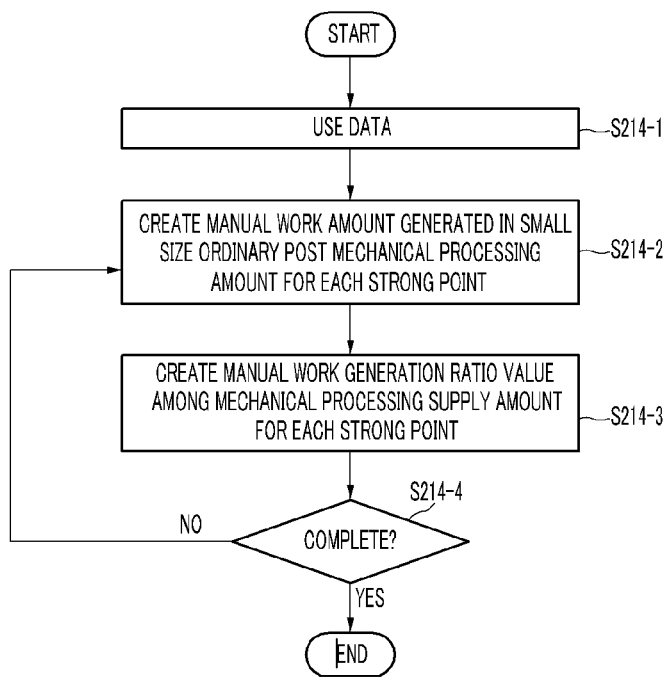

As shown in FIG. 15D, the manual work generation amount creation module 223-4 uses the administration result data for each strong point of the sorting facilities extracted from the administration and management data of the postal logistics information system in order to create small-sized manual amount data (S214-1). After the small-sized manual amount data is created (S214-2), values of a supplied amount and a sorting processing completion amount are created as the manual work generation ratio value of the corresponding strong point from the administration result data for each strong point of the sorting facilities, and are stored in the information storage 500 (S214-3). Thereafter, it is verified whether or not the manual work generation ratio value among the mechanical processing supply amount for each strong point is completed (S214-4), and until the creation is completed, the steps following step S214-1 are repeatedly performed.

Next, the demand estimation reference amount creation step (S220) and the future amount creation step (S230) of FIG. 13 will be described with reference to FIG. 16. The demand estimation reference amount creation step (S220) and the future amount creation step (S230) shown in FIG. 16 illustrate a step of calculating a nationwide amount.

Figure 16:
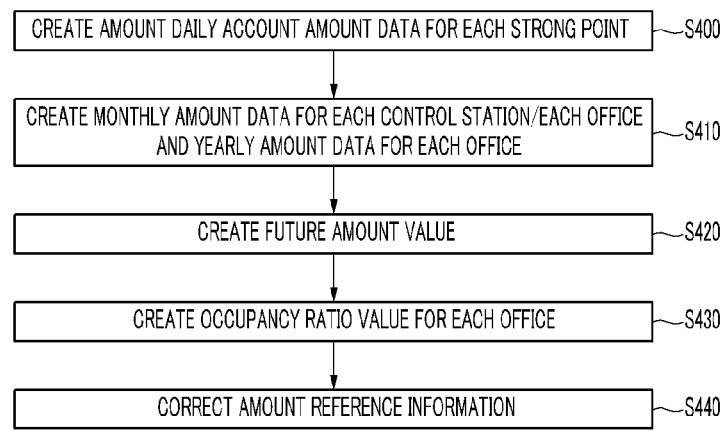
FIG. 16 is a flowchart illustrating creation of demand estimation reference amount data and future amount data according to an embodiment of the present invention.

FIG. 16 is a flowchart illustrating creation of demand estimation reference amount data and future material amount data according to an embodiment of the present invention.

As shown in FIG. 16, the amount data creation module 224-1 and the reference data creation module 224-2 create daily account amount data for each strong point by using ordinary-record (parcel)/non-record/special/ordinary postal monthly account data (S400). Thereafter, monthly amount data for each control station, monthly amount data for each office, and yearly amount data for each office are created (S410).

The parcel creates yearly increase/decrease value by a regression analysis result, and the amount variation creation module 224-3 creates a future amount value by using a type-based increase/decrease rate, an office-based CAGR value, etc. that are inputted from the user by referring to the created amount and increase and decrease ratio value (S420). At this time, the created future amount value is created in the form of an amount value for each type, each control station, and each day. Thereafter, the office-based occupancy ratio value is created and provided to the user on the basis of the nationwide amount (S430).

A process of transferring the amount increase/decrease rate value for the future year to the input data conversion step is performed through the demand estimation reference amount creation step (S220) and the future amount creation step (S230). In the input data conversion step, a future daily amount of the simulation is created by multiplying the nationwide amount increase/decrease rate input value by the daily amount value for each control station. Further, when the CAGP value for each office is inputted, the CAGP value is corrected similarly to the sum of amounts by the nationwide increase rate value, and the input data amount reference information is corrected on the basis of an inputted simulation period value and an actual increase/decrease rate value for each future year by creating the increase/decrease rate value for each future year (S440).

At this time, amount reference information corrected at step S440 is a correction for a nationwide amount. That is, when the CAGR value for each office is inputted, the CAGR value is also corrected similarly to the sum of amounts by the nationwide increase rate value, and the input data amount reference information should be corrected on the basis of an inputted simulation period value and an actual increase/decrease rate value for each future year by creating the increase/decrease rate value for each future year. For this, the amount reference information for each office should also be corrected.

As a method of correcting the amount reference information for each office, correction depending on an occupancy rate for each office or correction depending on an increase/decrease rate for each office may be performed and in the embodiment of the present invention, the method of correcting the amount reference information at the time of selecting the increase/decrease rate for each office will be described as an example. The embodiment of correcting the input data amount reference information for each office will be described with reference to FIG. 17.

Figure 17:
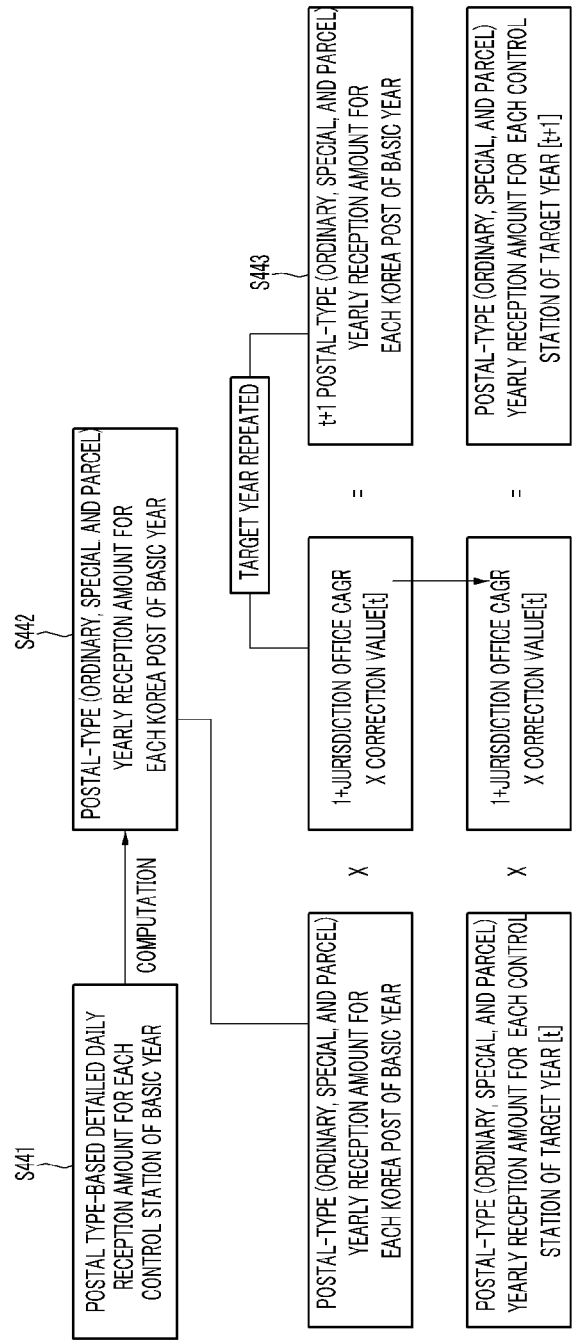
FIG. 17 is an exemplary diagram illustrating correction of input data amount reference information according to an embodiment of the present invention.

FIG. 17 is an exemplary diagram illustrating correction of input data amount reference information according to an embodiment of the present invention.

As shown in FIG. 17, the input data converter 220 gathers the yearly reception amount for each office and each postal type of the basic year from a postal type-based detailed daily reception amount (S441) for each control station of the basic year from the information stored in the information storage 500 (S442). The input data converter 220 corrects the postal type-based yearly reception amount for each office by multiplying a predetermined equation by the amount computed at step S442 (S443). At this time, the correction is repeated as many times as a target year value. Further, in the embodiment of the present invention, the predetermined equation exemplifies "1+Jurisdiction office CAGR×Correction value(t)", but is not limited thereto.

At this time, the postal type-based yearly reception amount for each office of the basic year may require correction of the postal type-based detailed daily reception amount for each control station of the target year in more detail. Accordingly, a predetermined equation used to compute the postal type-based yearly reception amount for each office of the basic year may be used to compute the postal type-based detailed daily reception amount for each control station of the target year.

As described in FIGS. 13 to 17, when the data are created, a procedure verifying whether or not the reference data created at step S210 is normally created is performed. This will be described with reference to FIG. 18.

Figure 18:
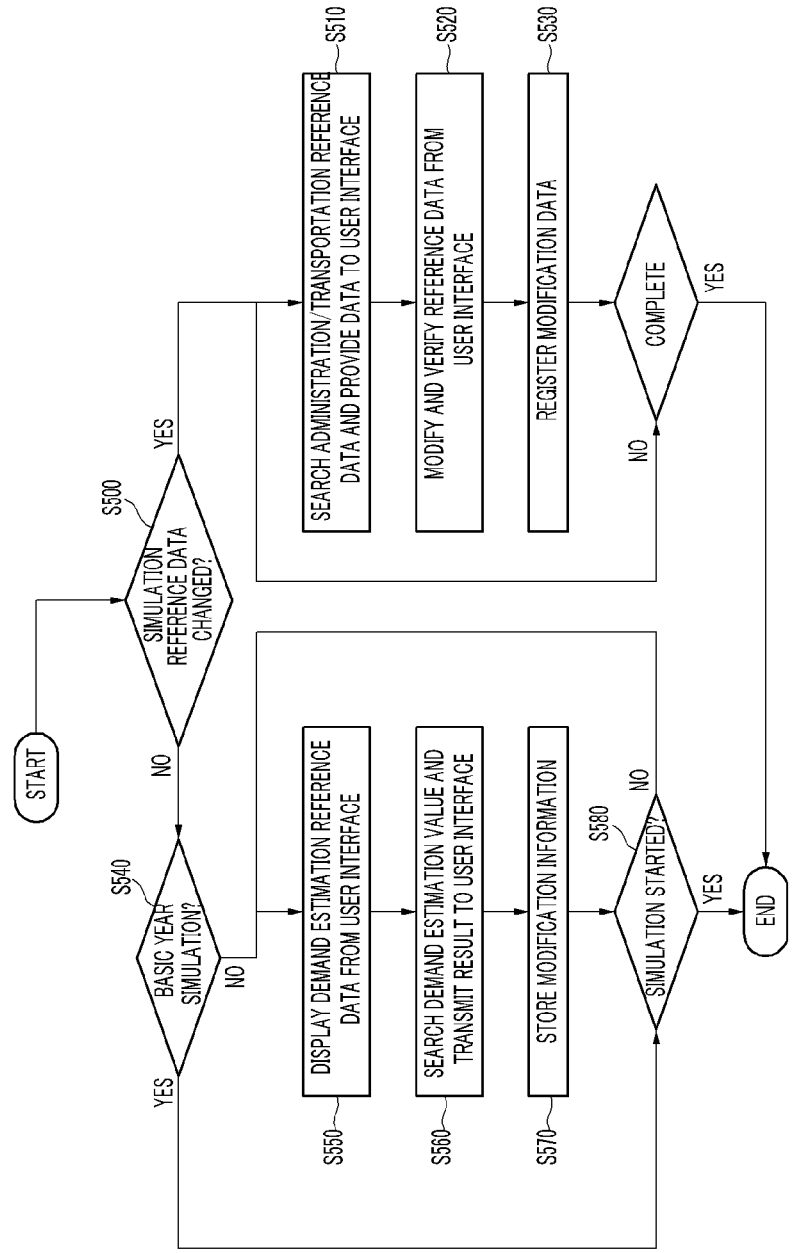
FIG. 18 is a flowchart illustrating a procedure of verifying reference data according to an embodiment of the present invention.

FIG. 18 is a flowchart illustrating a procedure of verifying reference data according to an embodiment of the present invention.

As shown in FIG. 18, it is determined whether or not modification of the administration reference data for the simulation is generated (S500). If the administration reference data is changed, the corresponding reference data is searched and provided through the user interface 100 (S510). In addition, after the reference data changed from the user interface 100 is verified (S520), the reference data is updated through the user interface and registered in the administration/transportation reference data 510 (S530). The process is repeated until registration of the changed data is completed.

On the contrary, when it is determined that the reference data for the simulation is not changed at step S500, whether or not the simulation is performed depending on the basic year is determined (S540). If it is determined that the simulation is performed, the simulation is started (S580). On the contrary, when it is determined that a standby is performed for the simulation, that is, when a message for starting the simulation is generated from the user interface, the demand estimation reference data is displayed on the user interface (S550).

In addition, a demand estimation value is searched and the result is transmitted to the user interface 100 (S560), and when the demand estimation value is updated by the user, the changed information is stored (S570). In addition, with respect to the demand estimation result and the simulation period (i.e., year, month), the simulation is performed by a process of generating the amount ratio value communicated to a delivery control station to the simulation input amount for each time and each working condition of the logistics center with respect to the reception amount for each control station (S580).

Next, continuously referring to FIG. 12, when the simulation is completed by driving the simulator 300 by step S130, the output data converter 230 receives a message indicating that the simulation is completed from a simulation engine and displays the simulation result data on a screen of the user interface. Next, when an alternative establishment start message is received from the screen of the user interface, the message is transmitted to the alternative establisher 400 and indicates that the alternative is established (S140).

When the user interface 100 receives a message indicating that the alternative is established from an alternative establishment engine, the user interface displays the corresponding alternative establishment result data on the screen of the user interface. Thereafter, the simulator 300 performs detailed load analysis simulation for each alternative in order to know the degree of the load at the time of using the established alternatives (S150).

The simulation result data storage module 520 of the information storage 500 stores a comparative evaluation result for the alternative, and the user interface 100 outputs the evaluation result onto the user screen in order to provide the corresponding information to the user (S160). When the user interface 100 receives information indicating whether or not to select the alternative from the user, the user interface 100 determines whether or not to complete the establishment of the alternative on the basis of the corresponding information (S170).

In addition, the user interface 100 provides comparison information so as to compare states before and after the yearly established alternatives with respect to the alternatives yearly established targeting overloaded strong points among the simulation results (S180). Thereafter, it is determined whether or not acceptance/application information indicating that the plan will be performed by using the corresponding information by the user (S190) and when it is determined that the plan is accepted by the corresponding alternative, the infrastructure is changed to reflect the corresponding details (S195). However, when it is determined that the plan is not accepted by the corresponding alternative, the steps following step S120 will be performed.

Next, operational flows of the administration process simulator 310 and the transportation process simulator 320 of the simulator 300 according to the embodiment of the present invention will be described with reference to the accompanying drawings. This is to grasp the processing ability currently processed by the central station in order to estimate the future amount and will be described with reference to FIG. 19.

Figure 19:
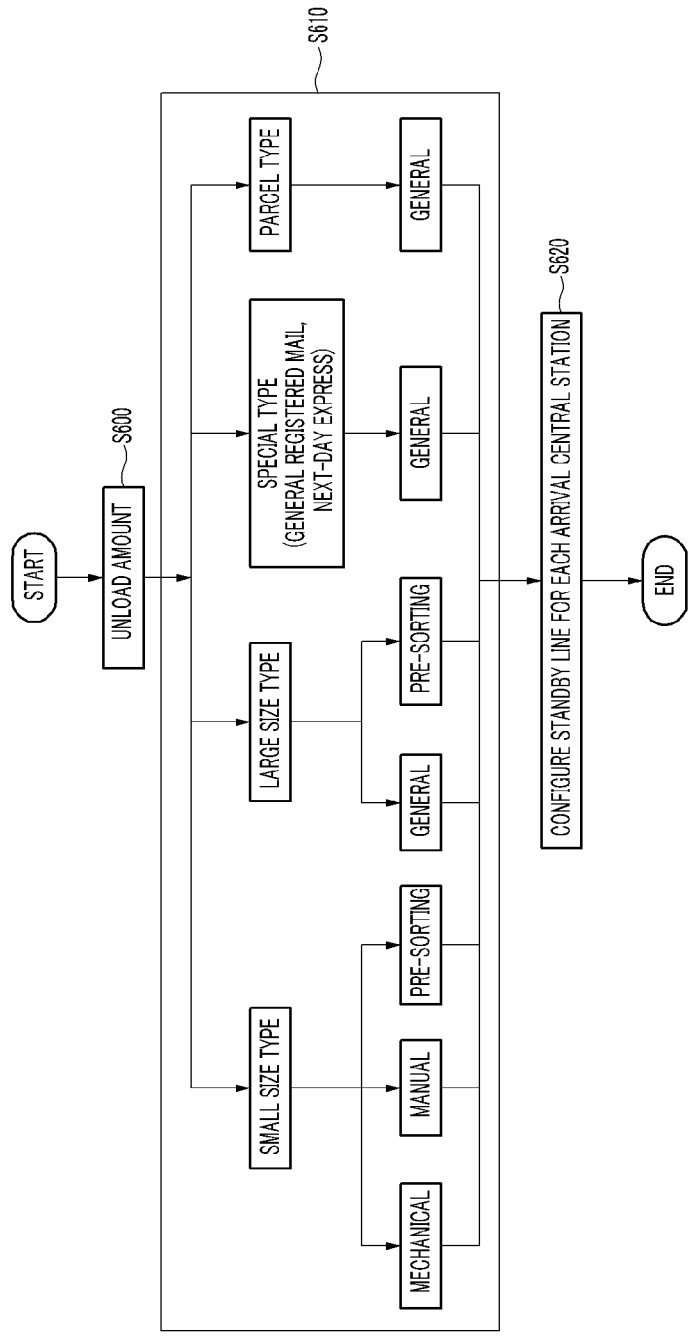
FIG. 19 is an exemplary diagram illustrating a configuration of a standby line by sorting of postal matters according to an embodiment of the present invention.

FIG. 19 is an exemplary diagram illustrating a configuration of a standby line by sorting of postal matters according to an embodiment of the present invention.

As shown in FIG. 19, when postal amounts arrive and are unloaded at the central station (S600), a forwarding sorting procedure is performed for each affiliated group (S610). The sorting-completed amounts stand by on a standby line for each arrival central station and are transported. At this time, ordinary/special/parcel are sorted to configure pallets (S620).

Figure 20:
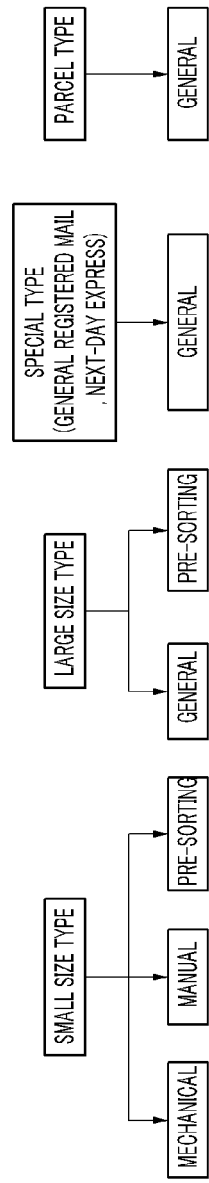
FIG. 20 is an exemplary diagram illustrating a work priority during simulation according to an embodiment of the present invention.

At this time, a work priority depending on the forwarding sorting procedure performed at step S610 of FIG. 19 is shown in FIG. 20.

FIG. 20 is an exemplary diagram illustrating a work priority during simulation according to an embodiment of the present invention.

As shown in FIG. 20, according to the embodiment of the present invention, the forwarding is largely sorted into a small-size type, a large-size type, a special type, and a parcel type, but the forwarding sorting is not limited thereto. The small-size type is sorted into mechanical processing, manual processing, and pre-sorting, and the large-size type is sorted into general processing and pre-sorting. The mechanical processing ability uses a machine for sorting efficiency. The sum of the processing abilities of all facilities regardless of the numbers of sorting facilities is represented as a mechanical processing ability (letter/hour).

In the case of the small-size type machine, an OVIS processing ability is used for forwarding sorting and an LSM processing ability is used for arrival sorting. Further, in the case of the small-size type machine, a re-input ratio is reflected on the forwarding sorting and a sorting efficiency is inputted. In addition, the re-input ratio is not considered for the arrival sorting. The mechanical processing amount type is reflected for each central station, and a case in which a packet sorting machine is used for parcel sorting may be reflected.

The small-size type manual work receives and uses the time processing ability (letter/hour) from the user interface 100. Meanwhile, since the small-size type pre-sorting does not influence the system load, a predetermined time (i.e., "minute/pallet") is granted to the pre-sorting. At this time, all central stations apply the same time and grant the same time to small-size pre-sorting and large-size pre-sorting.

In the case of the work priority in the forwarding sorting, the forwarding sorting is performed in accordance with an input sequence without priority (first in first out (FIFO)). In the case of the manual sorting, large sorting is performed at the time of the forwarding sorting amount work with respect to amounts of the native station, and thereafter, detailed sorting is performed, such that the priority is given to amounts of another station. However, the work priority is not considered for the arrival sorting.

In the case of the processing target amount, the forwarding sorting targets all received/collected amount, and the arrival sorting amounts included in the forwarding sorting amounts are also processed at the same time as the forwarding sorting time. In the case of the small-size type manual work, after all manual amounts are processed, the manual amounts generated after the mechanical work are processed at the same time.

Next, when it is verified that the postal amounts of FIG. 19 arrive at the logistics strong point, sorting-completed amounts are generated at the start step, such that a procedure up to forwarding the amounts by arranging the sorting-completed amounts on the standby line and forwarding the amounts is used, and will be described with reference to FIGS. 21 and 22. At this time, in the case of generation of the amounts of the control station, it is considered that the amounts are generated in the control station by adding up the reception amounts of the post office in the unit of the control station in addition to the amounts of the control station. A coverage of the basic year is used for calculating the amounts, and a coverage of the corresponding year is used for performing the simulation.

Figure 21:
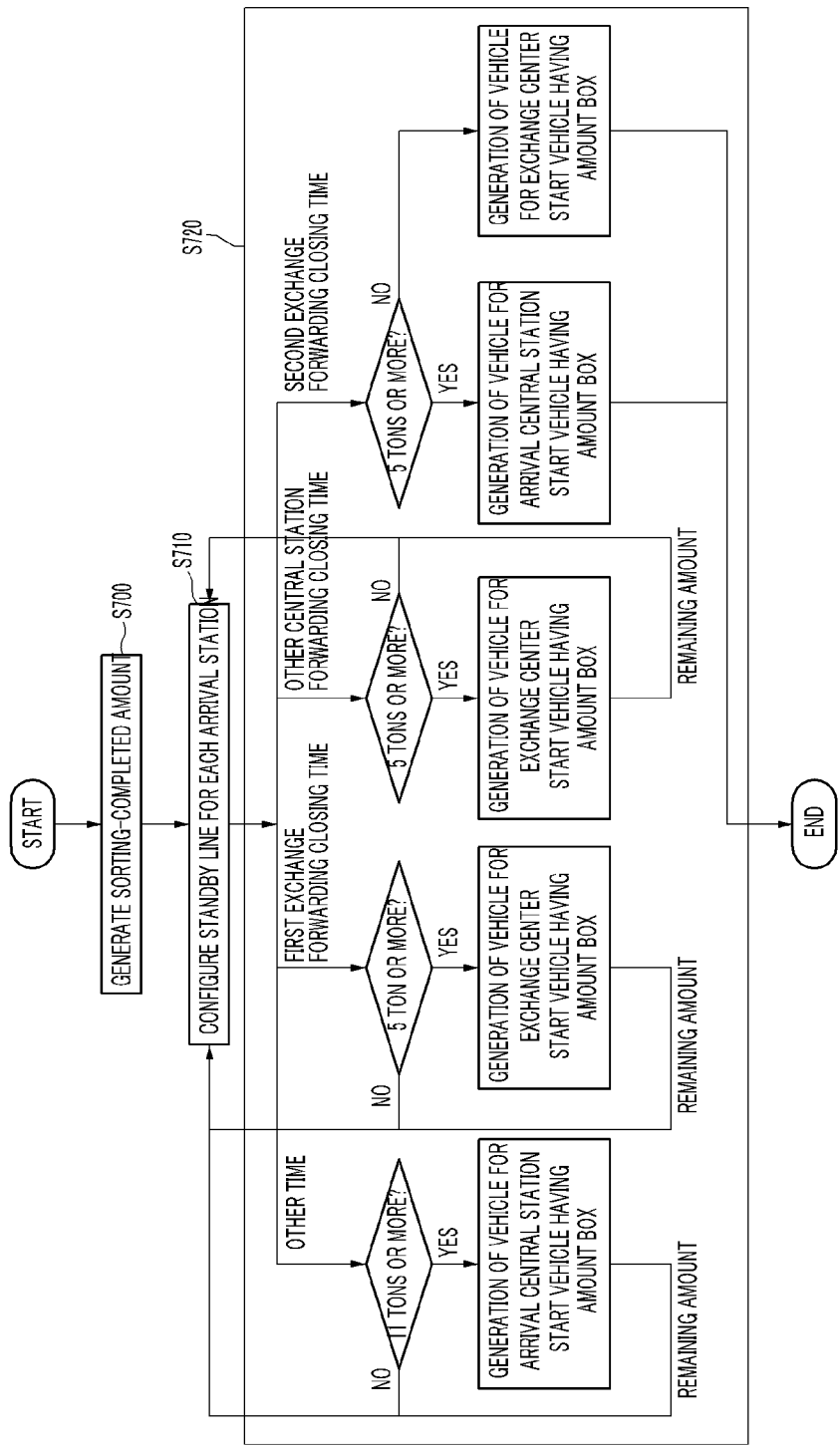
FIG. 21 is an exemplary diagram illustrating a standby pre-sorting procedure for transportation from a central station to an exchange center according to an embodiment of the present invention.
Figure 22:
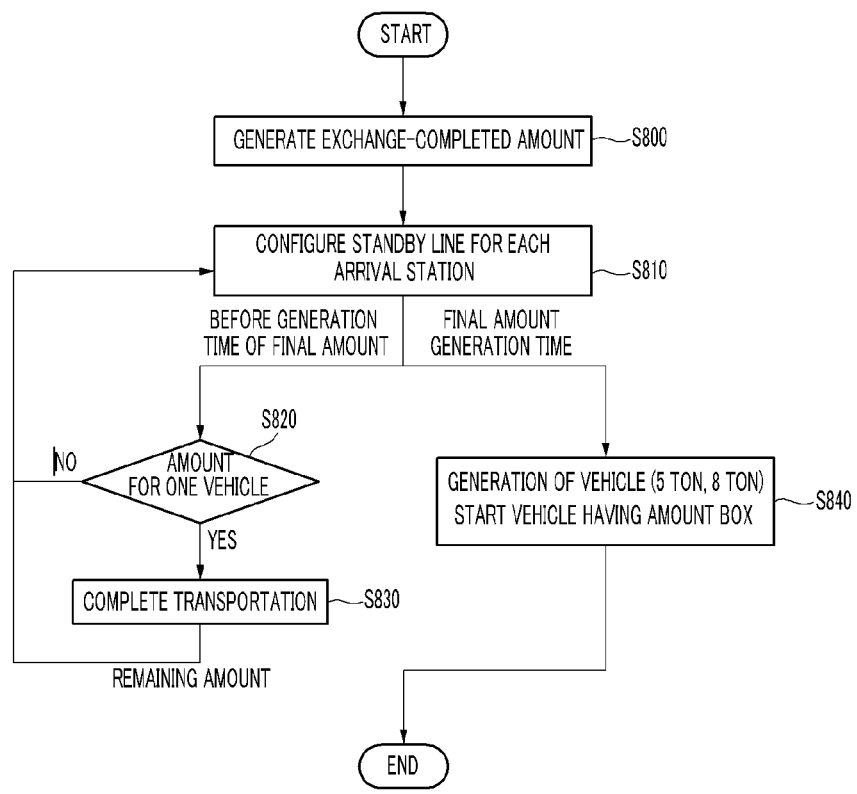
FIG. 22 is an exemplary diagram illustrating a standby pre-sorting procedure for transportation from an exchange center to a central station according to an embodiment of the present invention.

FIG. 21 is an exemplary diagram illustrating a standby pre-sorting procedure for transportation from a central station to an exchange center according to an embodiment of the present invention, and FIG. 22 is an exemplary diagram illustrating a standby pre-sorting procedure for transportation from an exchange center to a central station according to an embodiment of the present invention.

First, as shown in FIG. 21, when amounts that arrive at the logistics strong point are unloaded and the sorting-completed amounts are generated (S700), the standby line for each arrival station is configured (S710). Thereafter, a state indicating the delivery or not is determined depending on the postal type and the arrival time (S720). In the case of the ordinary post, the amounts that are distributed from the arrival central station to the control station before a second distribution closing time and arrive at the control station by being forwarded before a second closing time are delivered the following day, and amounts that arrive thereafter are delivered two days after. Accordingly, it is calculated that the amounts that arrive before a first distribution closing time are delivered in that day and the amounts that arrive thereafter are delivered in the following day. In the case of a next-day express, the amounts are delivered on Saturday or Sunday.

An exchange network transportation represents transportation between the central station (or logistics center) and the exchange center. The transportation is constituted by steps of vehicle generation, amount loading, and vehicle start. Amounts to be re-distributed to the forwarding sorted central station are prevented from being transported to other central stations and exchange centers. In addition, the parcel/special amounts are preferentially processed by giving a loading priority at the time of loading the amounts.

In order to determine whether or not the amounts are transported to the exchange center or the arrival central station depending on the amount level, the destination of the amounts is determined on the basis of the size of the vehicle and the maximum number of vehicles. In the embodiment of the present invention, the size of the vehicle is described by using 11 tons, 8 tons, and 5 tons as example, but is not limited thereto.

In a transportation logic of a central station to an exchange center/central station, when amounts transported to one central station is one vehicle (11 tons), the amounts are directly transported to the arrival central station. In addition, at a first exchange forwarding closing time, when amounts transported to one central station are equal to or more than 10 pallets, the amounts stand by, and when the amounts transported to one central station are less than 10 pallets, the amounts are transported to the exchange center (large vehicle is preferential, 11 ton→8 ton→5 ton).

In the case of a final vehicle for a first exchange center, when the final vehicle has parcel/special amounts, the final vehicle is sent without condition, and when the final vehicle has only ordinary amounts, the amounts are temporarily stored in the standby line. When amounts transported to one central station fill up one vehicle (5 ton and 8 ton), it is determined that the amounts are directly transported to the arrival central station, and when the amounts transported to one central station are less than 10 pallets, the amounts are temporarily stored in the standby line at the time of closing the forwarding of another central station.

As a result generated within the second exchange forwarding closing time, when the amounts transported to one central station fill up one vehicle (5 ton and 8 ton), the amounts are directly transported to the arrival central station, and when the amounts transported to one central station are less than 10 pallets, the amounts are transported to the exchange center (large vehicle is preferential, 11 ton→8 ton→5 ton). In the case of a final vehicle for a second exchange center, the amounts are transported without condition regardless of a loading rate.

Meanwhile, as shown in FIG. 22, in the case of a transportation of the exchange center to the central station, when an exchange-completed amount is generated (S800), the corresponding amount stands by for each arrival central station (S810), and it is determined whether or not the amounts fill up one vehicle (i.e., based on 11 tons) (S820). When the amounts are one vehicle quantity, the amounts are transported (S830). At this time, the pallet is sorted into the ordinary type, the special type, and the parcel type. The final vehicle determines a ton class (5 ton, 8 ton) for the amount (S840), and the final vehicle is sent without condition regardless of the loading rate.

A procedure after the alternative is established at step S140 of FIG. 12 will be described with reference to FIG. 23.

FIG. 23 is a flowchart illustrating a procedure after establishing an alternative according to an embodiment of the present invention.

As shown in FIG. 23, when the alternative established in the alternative establisher 140 is selected by the user (S900), some or all of functions for detailed alternatives which need to be established among various alternatives are established. The function establishment procedure includes an infrastructure establishment step (S910), a jurisdiction coverage designing step (S920), a network structure designing step (S930), and a processing ability controlling step (S940).

First, in the infrastructure establishment step (S910), a sorting facility of a new infrastructure and a manual processing ability per hour for forwarding and arrival sorting for each postal type (i.e., small size, large size, parcel, etc.) are received to calculate the sorting processing ability (S911). A processing ability of the new infrastructure is calculated by a value calculated by multiplying an available time for each postal type-based forwarding and arrival sorting of the new infrastructure by the processing ability per hour received the user interface in order to calculate the processing ability of the new infrastructure (S912).

In addition, forwarding and arrival jurisdiction of ordinary parcels of the new infrastructure are inputted to calculate forwarding and arrival sorting amounts for each infrastructure and each postal type (small size, large size, and parcel). This is to compute a sorting amount value for each infrastructure by performing a process of recomputing and calculating the amounts of the jurisdiction control station for each postal type-based forwarding and arrival for each infrastructure by adding or removing the control station to the new infrastructure.

When computation of the processing ability of the new infrastructure (S911) and computation of the sorting amount for each infrastructure (S912) are completed, a load for each new infrastructure is recomputed (S913). For this, the load for each new infrastructure is computed by dividing the sorting amounts computed for each forwarding and arrival for each infrastructure and each postal type (small size, large size, and parcel) by each processing ability.

Next, in the jurisdiction coverage designing step (S920), the forwarding and arrival sorting amounts for each infrastructure and each postal type (small size, large size, and parcel) is recomputed by receiving a modification plan for the jurisdiction infrastructure for each control station (S921). For this, the amounts of the jurisdiction control station for each forwarding and arrival for each infrastructure and each postal type are recomputed and calculated by changing the current jurisdiction infrastructure for the ordinary, parcel forwarding, and arrival for each control station. Thereafter, the load for each infrastructure is recomputed (S922).

Next, the network structure designing step (S930) is performed, and at this time, establishment of the exchange center, an exchange time, the processing ability, and the exchange change setting data are inputted and simply stored in a simulation DB to be used as the reference data for alternative simulation.

Lastly, in the processing ability adjusting step (S940), the sorting processing ability is recomputed by receiving a modification plan for a processing ability per hour of the sorting facility of the new infrastructure and the manual work for forwarding and arrival sorting for each postal type (small size, large size, and parcel). The sorting processing ability is recomputed for each infrastructure (strong point) by multiplying each available time by the processing ability per hour for each infrastructure, each postal type, and each forwarding and arrival (S941).

Therefore, when a function is removed due to ordinary and parcel dedication of the infrastructure or the function is again established by being adjusted, the amounts of the jurisdiction control station for each infrastructure, each postal type, and each forwarding and arrival are recomputed and calculated by adding or removing the control station to or from the infrastructure at the time of adding the function as a function of recomputing the forwarding and arrival sorting amounts for each infrastructure and each postal type (small size, large size, and parcel) by receiving the modification plan for the jurisdiction control station of the infrastructure (S942).

In the case of removing the function, the sorting amount for each infrastructure computed by recomputing the amount of the jurisdiction control station for each infrastructure, each postal type, and each forwarding and arrival jurisdiction control station is computed by changing the current jurisdiction infrastructure for ordinary, parcel forwarding, and arrival for each control station (S943). In addition, the infrastructure processing ability is adjusted through a process of computing the sorting amounts computed for each infrastructure, each postal type (small size, large size, and parcel), and each forwarding and arrival by each processing ability as a function of recomputing the load for each infrastructure while computation of the processing ability for each infrastructure and computation of the sorting amount for each infrastructure are completed.

When establishment of the alternatives is completed in accordance with the above-mentioned procedures, a detailed load analysis function can be performed by performing the administration and transportation simulation by using reference information on the result created during establishing the alternatives.

According to the embodiment of the present invention, a future amount is created through demand estimation by rectifying data administrated in a logistics infrastructure and an infrastructure load by a future amount can be analyzed, and an alternative can be selected through analysis of a load.

Further, it is possible to establish and change various long-term infrastructure establishment plans within a short time, and in addition, it is possible to verify the established alternatives.

The above-mentioned exemplary embodiments of the present invention are not embodied only by an apparatus and method. Alternatively, the above-mentioned exemplary embodiments may be embodied by a program performing functions that correspond to the configuration of the exemplary embodiments of the present invention, or a recording medium on which the program is recorded. These embodiments can be easily devised from the description of the above-mentioned exemplary embodiments by those skilled in the art to which the present invention pertains.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for alternative simulation of a logistics infrastructure, comprising:
   a user interface that receives data inputted from a user or provides information created in the system;
   a data statistics analyzer that converts data into a predetermined format in order to analyze the data collected by the user interface;

a simulator, running on a processor, that performs simulation for administration and transportation on the basis of the data outputted from the user interface or the converted data outputted from the data statistics analyzer;
an alternative establisher that establishes and outputs an alternative result depending on the data outputted from the user interface; and
an information storage device that stores reference information for the simulation, simulation result information, and alternative information,
wherein the data statistic analyzer includes:
a data migrator that converts data outputted from a postal logistics information system in link with the simulation system or the data outputted from the user interface into a predetermined data format;
an input data converter that creates a future year input amount on the basis of a predetermined demand estimation creation result required to start the simulation and outputs the created amount as simulation result data; and
an output data converter that converts the simulation result data created from the input data converter into output data so as to provide the simulation result data to the user,
wherein the input data converter includes
a registered mail matter input data converter, an ordinary mail matter input data converter, an administration and transportation reference data converter, and a future postal amount data converter, and
the registered mail matter input data converter includes:
a first amount creation module that extracts and stores amount data information for each reception point, each type, and each day among the data converted by the data migrator, and creates and stores reception amount information for each of a plurality of control stations;
a second amount creation module that creates and stores amount data of a forwarding control station and amount data of an arrival control station on the basis of the reception amount information for each control station that is created by the first amount creation module;
a ratio value creation module;
an input reference amount data creation module that creates input reference amount data for each strong point of the simulation for a predetermined year whern receiving a message including predetermined year simulation period information, predetermined year increase rate value information, and simulation request information from the user; and
an input amount generation module that generates the basic year input amount data to the simulation input amount at the time of performing the basic year simulation.

2. The system of claim 1, wherein
the ordinary mail matter input data converter includes:
an amount data extraction module that extracts and stores amount data for each strong point, each day, each postal type, and each working condition from the data outputted from the postal logistic information system;
a first control station and second control station input reference amount data creation module that creates a ratio value on the basis of forwarding/arrival/distribution amount values for each strong point from the data outputted from the postal logistics information system;
a manual work generation amount data creation module that creates additional manual work generation amount data when a manual work generation amount ratio value is generated after mechanical work;
a simulation input data creation module that creates simulation input amount data on the basis of a uniform distribution value of the basic year input amount when receiving the simulation start information from the input reference amount data creation module; and
an allocation amount ratio creation module that creates the input reference amount data for each strong point in order to perform simulation for the future year when receiving a request message from the user interface.

3. The system of claim 1, wherein
the administration and transportation reference data converter includes:
a work reference information creation module that extracts a type and a processing ability of a sorting facility and sorting work condition reference information for each strong point from the data outputted from the data migrator;
a time-based processing amount calculation module that acquires the processing ability data for each time from the data outputted from the data migrator and creates a processing amount value for each strong point and each time;
a ratio value creation module that creates forwarding/arrival/distribution amount and a ratio value for each strong point from the data outputted from the data migrator;
a manual work generation amount calculation module that creates a ratio value of a manual amount for mechanical processing generated for each strong point from the data outputted from the data migrator;
a contract quantity data creation module that acquires contract quantity data per parcel pallet from the data outputted from the data migrator; and
a transportation distance fee data creation module that acquires transportation fee data from the data outputted from the data migrator.

4. The system of claim 1, wherein
the future postal amount data converter includes:
an amount data creation module that calculates a daily account or monthly account amount for each strong point from the data outputted from the data migrator;
a reference data creation module that calculates amount data for each strong point and each year by using the monthly account amount calculated by the amount data creation module; and
an amount variation creation module that calculates a nationwide annual average growth rate by using amount data at a time prior to a current time and a newly created reference variation amount value.

5. A system for alternative simulation of a logistics infrastructure, comprising:
a user interface that receives data inputted from a user or provides information created in the system;
a data statistics analyzer that converts data into a predetermined format in order to analyze the data collected by the user interface;
a simulator, running on a processor, that performs simulation for administration and transportation on the basis of the data outputted from the user interface or the converted data outputted from the data statistics analyzer;
an alternative establisher that establishes and outputs an alternative result depending on the data outputted from the user interface; and
an information storage device that stores reference information for the simulation, simulation result information, and alternative information,
wherein the data statistic analyzer includes:
a data migrator that converts data outputted from a postal logistics information system in link with the simulation system or the data outputted from the user interface into a predetermined data format;

an input data converter that creates a future year input amount on the basis of a predetermined demand estimation creation result required to start the simulation and outputs the created amount as simulation result data; and an output data converter that converts the simulation result data created from the input data converter into output data so as to provide the simulation result data to the user, wherein the output data converter includes:

a result generation verification module that transmits the simulation result and the alternative result outputted from the simulator and the alternative establisher to the information storage;

a data search module that searches administration reference/transportation reference/amount/data for each coverage that are stored in the information storage and provides the data to the user through the user interface;

a detailed load analysis module that calculates an overload ratio and a daily maximum load for logistics strong points;

a vehicle requirement calculation module that calculates a vehicle requirement degree for each transportation section and transmits the vehicle requirement degree to the information storage; and a postal type-based satisfaction rate calculation module that calculates a postal type-based delivery reference satisfaction rate and transmits it to the information storage.

6. A system for alternative simulation of a logistics infrastructure, comprising:

a user interface that receives data inputted from a user or provides information created in the system;

a data statistics analyzer that converts data into a predetermined format in order to analyze the data collected by the user interface;

a simulator, running on a processor, that performs simulation for administration and transportation on the basis of the data outputted from the user interface or the converted data outputted from the data statistics analyzer;

an alternative establisher that establishes and outputs an alternative result depending on the data outputted from the user interface; and an information storage device that stores reference information for the simulation, simulation result information, and alternative information, wherein the alternative establisher includes:

an infrastructure establisher that establishes an infrastructure depending on the simulation result for amount information inputted to be estimated to be generated after the current time from the outside;

a jurisdiction coverage designer that recalculates a load for each infrastructure by resetting a previously set ordinary post and parcel jurisdiction coverages of the infrastructure;

a network structure designer that designs a network structure of the simulation system to create reference information of the simulation; and a processing ability adjuster that adjusts the sorting processing ability of the overloaded infrastructure to recalculate the load of the infrastructure.

7. A system for alternative simulation of a logistics infrastructure, comprising:

a user interface that receives data inputted from a user or provides information created in the system;

a data statistics analyzer that converts data into a predetermined format in order to analyze the data collected by the user interface;

a simulator, running on a processor, that performs simulation for administration and transportation on the basis of the data outputted from the user interface or the converted data outputted from the data statistics analyzer;

an alternative establisher that establishes and outputs an alternative result depending on the data outputted from the user interface; and an information storage device that stores reference information for the simulation, simulation result information, and alternative information, wherein the infrastructure establisher includes:

an information collection module that receives a communication time and distance/time setting data from the user interface, and transmits it to the information storage and stores the data as the reference data for the alternative simulation;

an infrastructure-based load computation module that calculates a sorting amount degree for each infrastructure from the information collected by the information collection module;

a new infrastructure processing ability computation module that calculates a new infrastructure processing ability from the information collected by the information collection module; and an infrastructure-based sorting amount computation module that receives the information calculated by the infrastructure-based sorting amount computation module and the new infrastructure processing ability computation module, computes a load for each infrastructure, and transmits it to the user interface.

8. The system of claim 6, wherein the jurisdiction coverage designer includes:

a setting module that receives ordinary post forwarding jurisdiction, ordinary post arrival jurisdiction, parcel forwarding jurisdiction, and parcel arrival jurisdiction setting information from the user interface;

an infrastructure-based load computation module that computes an infrastructure load by changing jurisdiction data on the basis of the reference amount information stored in the information storage and the information received by the setting module; and an infrastructure-based sorting amount computation module that computes sortable amounts for each infrastructure by changing the jurisdiction data on the basis of the reference amount information stored in the information storage and the information received by the setting module.

* * * * *